United States Patent [19]

Clarisse

[11] Patent Number: 5,247,651
[45] Date of Patent: Sep. 21, 1993

[54] INTERACTIVE COMPUTER PROGRAM SPECIFICATION AND SIMULATION SYSTEM

[75] Inventor: Olivier B. H. Clarisse, Naperville, Ill.

[73] Assignee: AT&T Bell Laboratories, Murray Hill, N.J.

[21] Appl. No.: 510,373

[22] Filed: Apr. 17, 1990

[51] Int. Cl.[5] .................. G06F 3/14; G06F 11/32; G06F 13/10; G06F 15/46

[52] U.S. Cl. ............................ 395/500; 364/229; 364/229.5; 364/230.6; 364/237.2; 364/238.3; 364/239.9; 364/245.6; 364/245.7; 364/269.4; 364/286.1; 364/286.2; 364/286; 364/286.3; 364/281.7; 364/280; 364/DIG. 1; 364/DIG. 2; 364/245.8; 364/256.3; 364/264.3; 364/264.7

[58] Field of Search ............ 395/800, 500, 550, 400, 395/325, 200, 600, 100, 775, 157

[56] References Cited

U.S. PATENT DOCUMENTS

| | | | |
|---|---|---|---|
| 4,656,580 | 4/1987 | Hitchcock, Sr. et al. | 395/500 |
| 4,677,587 | 6/1987 | Zemany, Jr. | 395/500 |
| 4,845,665 | 7/1989 | Heath et al. | 395/157 |
| 4,951,195 | 8/1990 | Fogg, Jr. et al. | 395/500 |

OTHER PUBLICATIONS

D. C. Halbert, "Programming by Example", PhD dissertation, University of California, Berkeley, 1984, No. 8512843, University Microfilms International, Ann Arbor.

J. G. Raeder, "Programming in Pictures", PhD dissertation, University of California, Los Angeles, 1984.

A. Goldberg and D. Robson, *SmallTalk-80-The Language and Its Implementation*, Addison-Wesley, Reading, Mass., 1983.

L. Gould and W. Finzer, "Programming by Rehearsal", Xerox Palo Alto Research Center, May, 1984, SCL-84-1.

O. B. Clarisse, "Visual Programming with Icons", PhD dissertation, Ill., Institute of Technology, Chicago, 1985.

G. Agha, *Actors-A Model of Concurrent Computation in Distributed Systems*, The MIT Press, Cambridge, Mass., 1986.

J. McAffer, "A Simulation System Based on the Actor Paradigm", Technical Note 89-4, Defence Research Establishment OTTawa, Feb. 1988.

H. W. Egdorf and D. J. Roberts, "Discrete Event Simulation in Artificial Intelligence Environment", AI Papers, The Society for Computer Simulation International, 1988.

(List continued on next page.)

*Primary Examiner*—Robert B. Harrell
*Assistant Examiner*—Daniel H. Pan
*Attorney, Agent, or Firm*—Werner Ulrich

[57] ABSTRACT

A computer program specification system is disclosed for interactively creating program specifications responsive to user input. The system includes facilities to respond to changes, supplied interactively, to a program specification without recompiling the program specification, and immediately to display a simulation of those changes. The system also supports the merging of actors, which are software objects comprising data structures and program procedures, and the merging of actor behavior. A user of the system creates a program specification by specifying actors for use in a plurality of scenarios, and operational steps of the plurality of scenarios. The system executes operational steps of a scenario to evaluate the consistency of the specification and actor data. Execution of an operational step comprises simulating the operational step upon the occurrence of predetermined conditions and storing the results of the simulation. Execution of a sequence of operational steps can be reversed or undone in order to insert a change in the specification prior to resimulating the undone sequence or other related sequences. Simulation of an operational step comprises one or more of: executing communications among actors, asserting relationships among actors, executing a logical or arithmetical computation for actors or requesting input of a decision choice.

42 Claims, 20 Drawing Sheets

OTHER PUBLICATIONS

A. Senteni, P. Salle and G. Lapalme, "An Extension of an Actor Language towards Discrete Event Simulations", Advances in AI and Simulation, The Society for Computer Simulation International, 1989.

R. Koymans, R. Kuiper and E. Zijlstra, "Specifying Message Passing and Real-time Systems with Real-time Temporal Logic", ESPRIT project 937.

IMTS, The Intelligent Maintenance and Training System, Behavioral Technology Laboratories, University of Southern California, Redondo Beach.

A. Parkes, "The Prototype CLORIS System: Describing, Retrieving and Discussing Videodisc Stills and Sequences", Information Processing and Management, vol. 25, No. 2, Great Britain, 1989.

C. Shearer, "KEE and POPLOG: Alternative Approaches to Developing Major Knowledge Based Systems", KBS 87, Pinner, UK. 1987.

Liljegren and Skagerwall, "FINE-A Feature Design Environment", SETSS89, Mar. 1989, pp. 1–5.

R. Blumofe and A. Hecht, "Executing Real-time Structured Analysis Specifications", Software Engineering Notes, vol. 13, No. 3, ACM Sigsoft, Jul. 1988.

D. Harel, "Statecharts: A Visual Formalism for Complex Systems", Science of Computer Programming, vol. 8, North-Holland, 1987.

J. Malhotra, "A Prototyping and Development Environment for Graphical and/or Symbolic Applications", Meta Software Corporation, Cambridge, Mass., DRAFT of Jan. 3, 1990.

R. M. Shapiro, "Validation of a VLSI Chip using Hierarchical Colored Petri Nets", Meta Software Corporation, Cambridge, Mass. 1990.

R. M. Balzer, "Living in the Next Generation Operating System", Information Processing 86, Elsevier Science Publishers, North-Holland, IFIP, 1986.

FIG. 3

OOSCRIPTS FOR COMPUTER LOGIN SEQUENCE

310 ~ (c:1, comp, term, (n < c:1 & computer-status = "on"), (), (send-login), "computer sends a login sequence")

320 ~ (c:2, term, user, (c:1 << c:2), (), (display "Please login:"), "terminal displays login prompt to indicate it is ready to accept login entry")

330 ~ (c:3, user, term, (c:2 << c:3), (), (keyboard-entry login-name), "user types login name or user id")

340 ~ (c:3.1, term, comp, (c:3 << c:3.1), (), (data-send entry-stream), "terminal transmits keyboard input")

350 ~ (c:3.2, comp, term, (c:3.1 << c:3.2), (), (send-passwd-prompt), "computer sends password entry sequence")

360 ~ (c:4, term, user, (c:3.2 << c:4), (), (display "Password:"), "terminal displays password prompt to indicate it is ready to accept password entry")

370 ~ (c:5, user, term, (c:4 << c:5), (), (keyboard-entry password), "user types password")

380 ~ (c:5.1, term, comp, (c:5 << c:5.1), (), (data-send entry-stream), "terminal transmits keyboard input")

LEVEL OF DETAIL 0

LEVEL OF DETAIL 1

CREATE TAPE

LOAD TAPE

COPY TAPE

REMOVE TAPE

RENT TAPE FILE

CREATE ACTOR

SET ICON STATE

CONNECT ACTORS

MAKE ACTORS VISIBLE

SET STATE DIRECTLY

PASS DATA VIA MESSAGE

CLONE ACTOR

MERGE ACTOR

TRANSLATION TABLE

AUTOPLAY

PLAY

SEQUENTIAL SIMULATION MODE

SMART SIMULATION MODE

CONCURRENT SIMULATION MODE

INTERACTIVE COMPUTER PROGRAM SPECIFICATION AND SIMULATION SYSTEM

CROSS-REFERENCE TO RELATED APPLICATION

This application relates to an application by P. T. Z. Kapauan entitled "Order Independent Rule-Based Program Specification System," Ser. No. 07/510,378, filed on Apr. 17, 1990, now abandoned and assigned to the same assignee as this application.

TECHNICAL FIELD

This invention relates to a method and apparatus for developing program specifications for computer systems and telecommunications systems.

BACKGROUND OF THE INVENTION

The development of complex computer programs or software systems for controlling operations of computers and telecommunication systems requires a large work effort. Computer programmers (software developers) expend a great deal of effort in designing, coding and testing complex software systems. The process of designing, writing and coding, called a software development cycle, often requires several years for a complex system. Over the years software developers have learned that the development cycle is shortened if a smaller fraction of the cycle is spent testing software and a larger fraction is spent in designing requirements for software and in designing and coding software.

In spite of advances in software technology, the development of increasingly complex computer software and software-driven systems remains difficult. This difficulty has increased the importance of an efficient, low error-rate software design process. Design of specifications is an important first step to facilitate the development of software. Specifications contain requirements that software systems must meet, and specify how the systems must operate. These specifications, like the software systems they describe, have become increasingly difficult to generate. One reason for this is the detailed knowledge of the software environment that is required to generate the specification.

Software simulators are used by software developers to ease the difficulty of developing and testing specifications by modeling the operation of software systems. Based on input about a system, simulators generate a program that models the operation of the system. Although simulators aid in the development of specifications, they present several problems. First, simulators are not based on a simple, familiar model; programming knowledge of at least the simulator "language" is required to generate an adequate model of a system. Not only must a developer be concerned with how a simulated system should operate, but, additionally, he/she must devote a significant amount of thought to developing the simulation program. Thus, complexity is added to the software specification process.

Next, simulators represent independent parts of a system as separate entities, requiring specific inputs and producing specific outputs. This is a problem because these entities cannot interact with each other (be "connected") unless the inputs and outputs correspond, and often they do not. Thus, a developer using a simulator cannot always see a total integration of system parts.

Finally, if, during a simulation, a developer discovers an error or wants to change some part of the operation of a system, the developer must stop the simulation, make the desired change, recompile the program to be simulated, and then start the simulation from the beginning. Thus, a developer cannot immediately view the results of a change, and this process of making a change is slow, resulting in an inefficient use of developer time.

A problem of the prior art, therefore, is that there is not an efficient arrangement for specifying software that does not require extensive programming knowledge by a user.

SUMMARY OF THE INVENTION

A specific embodiment of the present invention for solving the above problem is the Graphical Recording and Animation of Specifications (GRAS) system. The GRAS system is used to graphically record, simulate (animate) and refine program specifications interactively. This system provides for the design of program specifications through examples.

The objective of the GRAS system is to provide a facility for engineers with little programming knowledge to easily create program specifications. This objective is accomplished by providing a user-friendly environment based on a familiar model. The GRAS system is based on a video studio metaphor (VSM), wherein the creation of a specification for a program is analogous to creating, directing, videotaping, and editing a play. The video studio metaphor extends the theater metaphor used in programming by rehearsal; see, for example, *Programming by Rehearsal*, SCL-84-1, May 1986, Xerox Corporation-Laura Gould and William Finzer. Little programming knowledge is required to create specifications using a VSM based system. Advantageously, complexity is reduced in the software specification process because an engineer can concentrate on how an object system should operate with less attention being devoted to the operation of the specification system.

A user of the GRAS system supplies input for a "tape" which is a software recording of a specification. The GRAS system creates a tape by recording steps of a group of example scenarios and by deriving additional generic rules for these example scenarios. A step specifies an interaction between actors of a tape simulated via message passing. (As discussed hereinafter, the concept of "actor" is known in the field of artificial intelligence).

Actors are computer software constructs comprising data, and procedures that manipulate the data. Actors used by GRAS also have a knowledge base and a history of changes to the data. Actors represent physical components of system, such as a telephone or telephone switching system or software components such as a process or a database, or persons, agents interacting with the system. A user of GRAS records a step of an example scenario by specifying a sender and receiver actor for the step, a message to be sent from the sender actor to the receiver actor, and any conditions that must be present in the system before the step is executed. Each step is recorded as a rule on the tape and is executed in the example scenario. A user can interactively refine the tape by executing example scenarios (playing the tape), making corrections, adding new steps, or creating new example scenarios.

The design of a computer login sequence for a computer system provides a simple example of the use of GRAS. The actors for a computer login sequence are a computer, a terminal and a user. Assume that an engineer using GRAS would like the computer login sequence to be implemented as follows: (1) the computer activates the sequence by sending a "send login" request message to the terminal; (2) the terminal then displays a login prompt to the user; (3) the user sends a login name to the terminal via a keyboard entry; (4) the terminal transmits the login name to the computer; (5) the computer sends a message to the terminal to initiate a password entry procedure; (6) the terminal displays a password prompt to the user; (7) the user sends a password to the terminal via a keyboard entry; and (8) the terminal sends the password to the computer.

To supply input for a tape of the computer login sequence, a GRAS user begins by specifying the first step of the sequence. In so doing, the user is specifying the first step of an example scenario; a complete program is specified by a plurality of example scenarios. To specify step (1) above, the user first specifies the sender actor as the computer, the receiver actor as the terminal, and the message passed as "send login." This step would be graphically displayed for the user while being recorded as part of the example scenario. To specify step (2) above, the user specifies the sender actor as the terminal, the receiver actor as the user, and the message passed as "please login:." Again, this step would be graphically displayed for the user while being recorded. The user proceeds to specify the remaining steps of the sequence in the same manner. After recording the sequence, the user plays the tape, thus graphically simulating the computer login sequence. FIG. 5 illustrates a GRAS graphical display of the entire computer login sequence.

At any time during recording, the user can stop recording and play the tape to graphically simulate the steps already specified. If a step is incorrect the user can interactively "undo" the step, change actors, change the message, or change preconditions for the step, and then play the step again. This permits interactive editing and refinement of a program specification.

The above example illustrates the operation of the invention. In accordance with the principles of this invention, a computer, responding to interactive user input, creates a program specification. In a departure from the art, the program specification system provides facilities to respond to changes, supplied interactively, to a specification, without recompiling the specifiation program, and immediately display a simulation of those changes. Advantageously, a developer can create a specification more rapidly and more efficiently, and with little knowledge of the operation of the simulation system.

In a further departure from the art, the invention supports the merging of actors, which are software objects comprising data structures and program procedures, and the merging of actor behavior. The idea of an "actor" is well-known concept from artificial intelligence; see for example Gul Agha, *Actors: A Model of Concurrent Computation in Distributed Systems*, MIT Press, 1986. Advantageously, this merging allows developers to view a total integration of program system parts.

GRAS, an exemplary embodiment of the invention, is an object-oriented, knowledge-based visual programming system based on the VSM. GRAS uses the input of a user to create a visual simulation and specification database of the system, and builds upon that database as more detailed input is received. Advantageously, because the VSM provides a familiar, simple model, a user can generate a specification without a detailed knowledge of programming or of the system.

A SoftCoder module of GRAS provides the mechanism to record (enter), play (execute), and undo (reverse execution) example scenarios of the specification. The SoftCoder is a virtual machine that processes a "(video) tape program," describing rules of behavior between actors, and produces a "tape scenario" comprising a complete trace of the specification program execution. Each step in a tape program comprises a set of arithmetic and/or logical computations, actor data, and messages representing communications between actors that are reversible by "undoing" a step, thus providing users with a mechanism for interactively changing parts of the specification. Advantageously, a user can efficiently correct errors and make changes to a specification during a simulation and immediately view the results.

A management of visual object networks (MoVon) module and an actor frame (AF) module of GRAS provide a mechanism for the merging of actors and actor behavior, thus allowing a user to view a totally integrated specification. Advantageously, GRAS provides a facility for users to view the integration and combined operation of different parts of a specification.

The method of interactively creating specifications for a program comprises specifying actors for a plurality of tape scenarios, in response to receiving actor data via an input device, such as a keyboard or mouse, and storing the actor data. Specifying actors comprises creating new actors, selecting previously created actors, and modifying actor data. In response to receiving operational steps via the input device, the systems stores the steps for subsequent execution. These steps comprise communications among actors, relationships among actors, logical or arithmetic computations for the actors, and decision points for the plurality of tape scenarios. To evaluate the consistency of a specification, a first tape scenario is executed in response to receiving a first decision choice via the input device. Execution of the first tape scenario comprises simulating steps of a scenario upon the occurrence of a set of predetermined conditions and storing the results of the simulation. Simulating comprises one or more of the following: asserting relationships among actors, executing communications among actors, executing a logical or arithmetic computation for actors, or requesting input of a decision choice. Finally, additional tape scenarios are executed sequentially in response to receipt of alternate decision choices via the input device.

The system is arranged to stop a simulation after a specified operational step in response to an instruction received via the input device during simulation of the operational steps. In response to receipt of input data, the system then stores additional actor data and additional operational steps, and the simulation is resumed, with the additional steps and actors included. Advantageously, a user can interactively make additions to a specification and immediately view the results of those additions.

Operational steps are reversible ("undoable") during a simulation. An undone step is modified and the simulation is resumed, re-simulating the undone steps in their modified versions. Advantageously, a user can interactively make changes to a specification and immediately view the results of those changes.

Simulating the operational steps comprises automatically identifying decision choices for which a program path has not been specified, and notifying a user of these choices and incomplete program paths. Also, simulating the operational steps comprises checking whether an actor's data is complete and notifying a user of incomplete data. Advantageously, a user can simulate an incomplete specification.

A plurality of levels of display are available in the system, with each level corresponding to a level of detail of the simulation. A user may specify a different set of levels for each operational step. When executing a tape scenario, the GRAS system displays results only for those steps which are at a level which is a member of the set, even though it simulates all steps of other specified levels. Advantageously, a user can interactively refine a specification by adding more detailed steps to the specification as more information becomes available, and viewing the results of simulating the more detailed steps.

The GRAS system permits simulation of two or more operational steps concurrently. If any actor is common to both concurrent program paths, the system ensures that other actors accessing data of the common actor do not access the same data at the same time. The system can delay simulation of an operational step of the tape scenario for a prespecified time or for a time computed during simulation from the time of simulation of a first operational step, or delay simulation of a first operational step until a second operational step has been simulated. The GRAS system may further execute a called tape program as part of execution of a calling tape program and return to the calling tape program following the execution of the called tape program. The system may also insert a copy of a subset of a second tape program after the simulation of a first operational step of a first tape program and prior to the simulation of a second step of the first tape program. Advantageously, concurrent simulation of operational steps gives a realistic view of system operation resulting in consistent specifications.

BRIEF DESCRIPTION OF THE DRAWING

The invention will be better understood from the following detailed description when read with reference to the following drawing in which:

FIG. 3 is a data diagram illustrating the contents of a script for specifying the computer login sequence.

DETAILED DESCRIPTION

Figure 1:
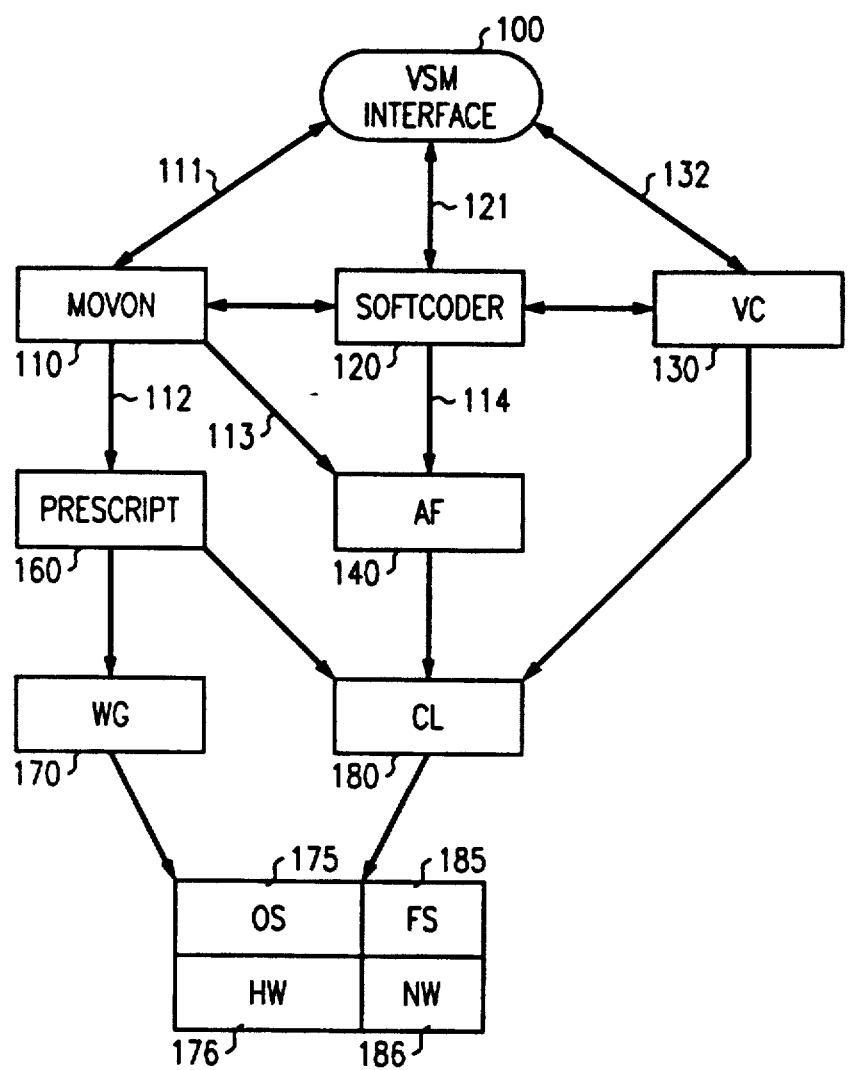
FIG. 1 is a block diagram of the GRAS system architectural structure.

The Graphical Recording and Animation of Specifications (GRAS) system is based upon several key concepts that are described in a special terminology, useful for this type of system. An understanding of these terms is helpful in understanding the GRAS system. The special terms used in GRAS are defined below.

Glossary of Important Terms

BackStage: each actor in a given Production Studio is known by its unique address (e.g. birth name and address, social security number). The set of all actors available at one time is called the BackStage. Each actor has only one existence in this context, even if it is used in several tapes and is physically shared between the tapes currently available in the GRAS system. Before or while a tape is being recorded, one or more Studio Rooms can be chosen. Each Studio Room can be used to record a different perspective or view, each studio has a recording camera. Actors are chosen/added before or while recording, as needed.

Frame: a frame is a flexible data structure used for information classification or concepts organization. The flexibility of the data structure comes from the fact that it is usually dynamically extensible and redefinable. Frame systems are usually equipped with a hierarchical inheritance mechanism based on the IS-A or AKO(A kind-of) classification scheme.

Actor: an actor is an extension of an object. An object comprises data and procedures that manipulate the data. An actor encapsulates data as an object (using slots and values). However, the encapsulated set of slots as well as the actual values of these slots can vary with time and these variations are reversible. From the metaphorical view, an actor can learn and forget categories of information and information values as well as remember what information it had at any specific moment in its life. To implement this feature, an actor keeps a history of changes made to its data space (slots and values). An actor is able to produce a symbolic description of its current data-space at any time (self description) and/or a symbolic description of the difference between its symbolic data-spaces at two different times; these descriptions are maintained in a history by the implementation of the actor system.

Implementation of Actors: the implementation of actors for GRAS supports the following capabilities: an actor's generic properties include its ability to learn a new role, to forget a previous role, to transform existing information, to acquire new information, to communicate information to other actors, to be (optionally) visible in various costumes (visual representations are optional attributes of such actors). An actor can be shared, reused, merged, divided, organized as a combination of actors or decomposed into sub-actors. Based on a logical or arithmetic calculation, the role of an actor can be modified by a particular situation.

Actor knowledge base: the set of an actor's attributes (slots and values) that can be accumulated (learned) and removed (forgotten) constitute an actor's dynamic private knowledge base. Privacy of the knowledge base is defined here in the following sense: The knowledge is not directly accessible to (and not shared with) other actors. Actors information is only accessible to other actors who explicity request it during a transaction. An actor knowledge base is defined using actor environment, an implementation of the actor data-space description D(A,t).

Actors and inheritance: the AKO relation used in the frame description of actors is internally used to provide frame classification. In GRAS, however, the AKO relation is not directly accessible to the user. The available set of operations on actors is sufficient for users to design actor oriented models of communication without requiring multiple inheritance. Inheritance is only provided to the user of GRAS if it can be semi-automatically maintained by the actor system.

Actor Merging and Fusion: additional flexibility is provided in the actor model by the concept of Merging and its implementation. Various levels of Merging are possible as follows:

1) renaming: the stage name of an actor is replaced by a new stage name, the actor uses the same set of rules; the stage-name is the name used to refer to this actor in the execution of a specific scenario;

2) address change: the address (identification) of the actor is changed; if the new address is that of an existing actor, a merge is actually performed;

3) merge: actor A is merged with another existing actor, B; the type of merge can vary continuously from the resulting new actor C becoming B (attributes and relations) to C becoming A or C becoming a combination of attributes and relations from A and B; in all cases, the resulting actor C inherits all rules from both A and B; the applicability of these rules is a function of C's resulting attributes and of preceding rules; if certain rules never apply, they may be removed; some of the rule maintenance can be automated based on logical analysis and reachability algorithms;

4) fusion: the actor is fully added and fused with a second actor (C=A+B); this a case of a complete merge; the result is a new actor that is used wherever either actor was used before the fusion took place; therefore the new actor inherits all the rules from both actors, the new actor is also a "monster" in the sense that it also inherits all the relationships and components from both actors; for example when fusing a terminal with a plain old telephone service (POTS) phone, the resulting "monster" is a phone-terminal that has both the features of a terminal and a POTS phone; this "monster" can be interpreted as either a terminal with POTS phone features or a POTS phone with terminal features; this feature is useful when experimenting with new designs.

Merging two actors can result in merging two networks of actors and their relationships. A network of actors comprises a group of actors connected by relationships. For example, a network of actors can be based on the A-Kind-Of (AKO) relation. One network of actors (NA) could comprise all actors that are A-Kind-Of German, and another network (NB) could comprise all actors that are A-Kind-Of Frenchman. If an actor A is A-Kind-Of German, and an actor B is A-Kind-Of Frenchman, then the merge of (NA) and (NB) can result in either all Germans becoming Frenchmen, or all Frenchmen becoming Germans, or all Germans and Frenchmen becoming Franco-Germans, a combination of the two.

The merge operation provided for actors is dynamic, it can be called by the user at run-time. Moreover, since actors have the ability to memorize changes to their attributes and relations, it is possible to implement a mechanism to undo merging as any other operation on actors. Undoing a merge operation is called splitting.

A split operator is made available to provide a decomposition mechanism and assist design evolution from a complex actor to communication mechanisms between a set of simpler actors. This is particularly important since sending or processing communications are atomic operations. Splitting provides a mechanism to decompose a communication into smaller atomic operations.

Actors and Objects: actors do not have message passing methods explicitly defined, instead they inherit from the Actor class the basic methods to learn, forget attributes and behaviors, to send and process communications, and to simulate behaviors. Instead of originally inheriting from various (predefined) classes, actors can be progressively defined and refined, new information slots and values being added, changed or removed as needed. From the metaphorical view, an actor's "personality" or general behavior is not known a-priori but is gathered a-posteriori from all the tapes where this actor is playing. Actors do not exist by themselves as traditional objects with a predefined set of behaviors. They exist in the context of various scenarios where various behaviors are made available for them.

Audition: refers to the process used to select an actor to perform a given task. An actor can be selected for its talents, where a talent is defined as a function of the actor's attributes (attributes are in direct correspondence with the actor behavior) and of the current set of relational dependencies between the actor and other actors. The process of audition (audit) involves identifying among a pool of actors an appropriate match to perform a given task.

Creation: is the process of creating a new actor following a talent description. A new actor data-structure is built with initial attributes matching the description. A creation operation may result in the creation of a set of actors and relations (an actor network). If the talent description is empty, a minimum actor data-structure is created. If the actor talent description contains or evaluates to a specific actor address (identification) and an actor already exists at this address, this actor is reused.

Destruction: is the action of removing an actor address from an actor pool, stopping its history, removing the actor data-structure, relations to other actors and (optionally) the actor visual displays from devices where it is currently visible. This process may or may not involve "garbage collection" (removal of obsolete data) depending on the implementation.

Replacement: when an actor is unable to complete a task, a replacement actor may be selected in place of it. Replacements are done using an audit process.

Transfer: given two actors A and B, a transfer from A to B results in giving all attributes and relations from A to B while preserving the respective addresses (identifications) of A and B.

Cloning: cloning an actor results in making a new instance of the actor with all the attributes of the original one at the current-time. A clone can physically share the attributes of the original (to save space) until a change is made to one of the attributes of either the clone or the original resulting in physical separation of these attributes. By default all values are initially shared between the original and the clone except for attributes of actors that are actors themselves. Assume, for example, that an actor in the system is a phone with two attributes, a handset and a phone number. The handset can also be an actor. If the handset is also an actor in this example, cloning the phone results in the clone and the original initially sharing the value of the phone number, but not sharing the same handset. This is because the handset "attribute" of the clone is a new actor. Only values are shared between the clone and the original, not actors.

Cloning an actor may result in cloning a network of actors that are connected to each other by a relationship (e.g. an actor and its components under the Part-Of relation). A clone has a different address than its original. Cloning is a mechanism to make inexpensive copies (since data is reused until it is changed). The (optional) visual representation of a clone is identical to the original except for the addition of instance numbers in the name of actors instantiated.

Rule of Behavior: in the VSM, a rule of behavior is an extension of the above definition to include a set of actors (used as independent knowledge-bases of facts), a combination of predicates on these knowledge-bases, a set of communication messages between the actors and a set of computations and assertions. A rule of behavior R on an actor set A can be described using the form:

$$R(A):f(P(A))=>M(A)=>g(Q(A,M(A))))$$

where A is a set of actors, P(A) is a set of predicates on the actors, f(P(A)) is a function (e.g. a boolean expression) of these predicates, M(A) is an optional set of communications between the actors, Q(A,M(A)) is a set of computations and resulting assertions made to actors of the set A based on the actors knowledge and on information derived from the communication set M(A), and g is a composition function (e.g. a boolean expression) used as a measure of completion of rule R(A). Under the boolean assumption, g(Q(A, M(A))) should be true when the execution of R(A) completes successfully.

In the definition of R(A), the set A can be defined explicitly (i.e. enumerated): A=a1, a2, ..., an or implicitly. If A is defined implicitly. A can be described using a set of logical rules to identify actors for the rule R(A): A=Audit{X1, X2, ..., Xn} these logical rules can portray characteristics {X1, X2, ..., Xn} required of each actor to play a given role. Characteristics can be pattern matching expressions composed of actor attributes and values. For example actor characteristics can include type checking, class dependency checking, connection type checking (is there a wire connection between "a" and "b"?), or value matching (is there an 800 phone number to this office?). An audition process (audit) is used to identify candidate actors described by the set of characteristics for rule R(A). A rule describing actors of A can request creation of new actors, reuse or combination of existing actors.

OOScript: refers to a particular format and syntax used to represent a single transaction between a sender actor and a receiver actor. An OOScript is a particular textual representation of a single transaction between two actors. Each OOScript can be used to describe one rule of behavior involving one or two actors. However, the OOScript syntax does not provide for the description of actors. The OOScript representation belongs to the class of formal representations for Rules of Behavior defined above. In the GRAS implementation, for example, OOScript tuples are used to provide a simple textual format to interface between the internal rule structure (maintained by the inference engine) and the user (or external application systems).

Role: the role of an actor is the set of all the rules of behavior that apply to it in a given context. An actor's behavior can be changed dynamically since, for an actor, each rule of behavior requires interaction with other actors.

Tapes in the VSM

Tape Program: a Tape Program contains an initial (and optional) set of actors and a set of Script Rules or General Scripts which define rules of behavior between actors. A Tape Program is said to be actor correct if it comprises all the actors necessary for its execution. Similarly, a Tape Program is rule correct if it comprises all the rules of behavior necessary for its execution, and a Tape Program is sub-tape correct if it comprises all references to Tape Programs necessary for its execution. A Tape Program lists all the actors and all the rules (or other tapes) necessary for its execution. A Tape Program may have an empty set of initial actors since Script Rules or General Scripts can be used to create the initial actors.

Tape Scenario: the execution of a Tape Program produces one or more Tape Scenarios which are the execution history of a given set of Script Rules from the original Tape Program corresponding to scenario variations.

Tape: a tape is composed of two reels, a future-reel or Tape Program and a past-reel (comprising one or more executed tape scenarios), a tape counter, an optional set of initial actors, an optional description of multiple views, required for its visualization, and additional information used for reference and documentation. The future-reel represents the set of available behaviors, the past-reel represents the history of execution of the tape. It contains instances of rules previously used and history of actors involved in these rules. The tape counter indicates the simulation count (or time) for the number of steps already executed in the tape (past-reel). When a tape is fully rewound, its past-reel is empty, i.e., the execution history is lost and the future reel contains the set of all rules that have been derived so far.

Tape Class: the class of tapes defines the class of computational entities and operators required to support semi-automated (assisted) program manipulation based on a video-tape or film editing analogy.

Tape Shelf: a tape shelf is a set of tapes.

Stretchable Tape: tapes can be edited, cut and pasted together like Super-8 movies, allowing easy changes of scripts and behavior as well as integration and combination of several tapes into one tape. During recording, tapes are automatically stretched to record new communications or more detail about a specific communication. A tape is also automatically stretched to provide room to insert more Script Rules, generated by the GRAS system or in response to user input, between two existing ones. The tape implementation supports recording at various levels of detail and in multiple views (each tape has multiple tracks). In the VSM, recording does not erase existing scripts from the tape, but inserts new scripts between existing ones. Deleting scripts is done by cutting or menu selection (command) to remove a Script Rule.

Tape Cutting: cutting a tape occurs at its current position (in simulated time) and produces two tapes which are valid tapes by themselves. To cut a tape, select the Film Editor. These tapes will both be stored on the tape shelf after cutting. The tape is copied before it is cut. Cutting the tape creates two half tapes that are automatically repaired by adding a future-reel to one side and a past-reel to the other, creating two new executable tapes. The viewer is prompted to name the two new tapes.

Tape Gluing: gluing tapes joins two or more tapes together into one continuous tape. To glue a tape, select the Film Editor. Tapes are copied before they are glued, the past-reel of the first one and the past-reel of the second ones may be unwound. The end of the first one is then glued to the beginning of the other, the two spare reels vanish during this operation.

A user may glue together more than two tapes. Gluing several tapes can lead to serial execution of the tapes viewed in sequential simulation mode and parallel execution in concurrent simulation mode, even though the tapes internal representations are identical.

Tape Query: a tape query refers to a tape recorded with partial descriptions of actors and communications. Partial descriptions can be audit expressions and pattern matching expressions for preconditions, postconditions and messages. A communication between actors from a tape query is used to retrieve, by pattern matching on script structures, similar communications from a given set of Script Rules.

Internal Tape Invocation: is the invocation of a tape (sub-tape) directly from the tape shelf while executing the current tape. The invocation is triggered by a postcondition to a Script Rule in the current tape. An instance of the tape is created that is executed in the current SoftCoder context. The actor system currently used may or may not be reused by the sub-tape at the discretion of the designer. If the sub-tape specifically refers to an actor used in the calling tape, this actor is reused. Recursive tape invocation is the special case of the current tape or one of its sub-tapes invoking itself.

Tape Compiler: is a processing mechanism on the set of Script Rules defining a tape to provide more efficient execution to the possible detriment of editing and undoing. The result is a compiled tape. A tape compiler can provide more efficient execution by removing the graphical representation of actors and the graphical side-effects of communications and connections between actors in the tape. A tape compiler may also modify the set of Script Rules in the tape for optimization and produce a pre-computed lattice of Script Rules for fast execution.

Visual Query: is a set of interactive visual operations designed to formulate queries and retrieve information from the tape shelf. The same mechanism is used to formulate a visual query that is used to record a standard tape, except that a tape query is generated and then matched to portions of tapes from the tape shelf. The result of the query applied to the tape shelf is an ordered set of tapes with a list of pairs. Each pair comprises a number that is the confidence value of the candidate match and a pointer to the location in the Tape Program where the candidate match was found. As a result of a visual query, a user may inspect the graphical simulation of each tape around the location where the match was successful. This is useful for retrieving design information and building new designs from existing ones.

Actors in the VSM

In the VSM, actors represent a similar concept as in theater and movie production. Actors are available from a pool of individuals residing in the BackStage. Actors can be created (new) on demand or obtained from a pool of previously created actors. They live (exist), perform (play) and die (are destroyed). In addition since actors are computer entities they can be copied, reused, merged, split, and replaced. Actors can be loosely defined for certain scripts, in which case an audition process (audit) is conducted to select actors with appropriate characteristics from a pool. From the user perspective, actors must appear as very flexible agents to store and access knowledge and perform computations.

Actors can be members of zero, one or more tapes. A tape lists the address of all actors that play in the scenarios derived from simulating the tape. This list may vary in time. In the VSM, a tape is originally built from examples. Building behaviors by example implies that specific instances of actors are created and used during the recording of the tape.

Script Structure

The data-structure used to implement Rules of Behavior in the GRAS system is of the form: Saddress = - (Type,Sid, Group-Saddresses, Pre-Saddresses, Post-Saddresses, Sender, Sundo, Receiver, Rundo, Preconditions, Message and Arguments, Postconditions, Documentation). The arguments of script are defined as follows:

"Saddress" is the address of the Script Structure in a given processor. When Script Structures are distributed on independent processors, an Saddress can have a prefix giving the address of the processor (e.g. Saddress: = ProcAddress:Saddress).

"Type" is a legal combination of the Script types: Rule, General, Instance, Group, Wait, Undoable, Sent, Processed. The type is used by the inference engine to process the Script Structure according to the description of the Script Type. The types Rule, General and Instance can be combined with type Group. The types Instance and Wait can be combined with type Undoable. The type Instance can be combined with the type Sent or Processed.

Sid: an identifier used for symbolic reference in other Script Structures and for symbolic presentation to the user.

Group-Saddresses: used when a Script Structure is of type Group to refer to the set of Script Structures that are members of the group.

Pre- and Post-Saddresses: are structures of Saddresses to other Script Structures. This is used to provide support for the design of efficient execution mechanisms that enhance the performance of GRAS on particular architectures. Typically, Pre-Saddresses of a Script Structure S are addresses of Script Structures that may directly precede the execution of S, and Post-Saddresses indicate Script Structures that may directly follow the execution of S. This provides a lattice structure for efficiently executing and reversing the execution of large sets of Script Structures.

Sender and Receiver: are expressions referring to the sender and receiver actors in this Script Structure. Depending on the script Type the expression is interpreted differently.

Sundo and Rundo: are expressions describing a set of computations required to undo all changes to the sender and receiver actors, respectively, caused by the execution of the Script Structure. Sundo and Rundo are empty for Script Structures of type Rule, and General.

Preconditions: a precondition expression is a combination (e.g. a boolean expression) of functions, and logical tests on the attributes of the script actors at the current simulation time. Preconditions based on sender and receiver actors are permitted to simplify the design; however the preferred style is to separate preconditions on the sender actors and preconditions on the receiver actor. To access information about a receiver, a request should first be sent to the receiver and the result from its reply should be used in the precondition of the next rule. On each processor where a set of actors is performing scripts, a clock is available where required, and if so, a finite time-history of Script Structure execution is maintained. Under these assumptions, preconditions can include time dependencies, that is timing expressions formed using time operators and execution time of other Script Structures. Timing expressions may be used to order the execution of Script Structures (based on their unique script-identifiers). In the GRAS implementation, the simulated-time constraints are based on the OOScript notation.

Message and Arguments: "Message" is a symbolic name of an optional message passed between sender and receiver actors. A message is used to communicate information between actors. When arguments are specified they comprise an arbitrary set of data or computation expressions based on data from sender actors.

Postconditions: a postcondition expression describes changes made to an actor's attributes based on computations performed on initial attribute values, and in the case of receiver actors, on data computed or transferred to the receiver via the message passed. It is preferable to decompose the Postconditions into postcondition expressions for the sender actor and postcondition expressions for receiver actors.

Documentation: a field used to comment on the function of the Script Structure. The documentation can include symbolic references to the actors of the Script Structure and their attributes and data. The documentation may read differently depending on the data contents. The documentation is minimally a text description, but graphics, video and audio may be used in particular implementations.

The actor attributes tested in preconditions or changed in postconditions can represent relationships between actors (relationships between sender and receiver actors). In addition, entries performing input/output functions with the outside world (for example, asking the user a question) are accepted in preconditions, messages and postconditions but recommended solely in postconditions. All preconditions are tested in parallel, all message attributes are communicated in parallel and all postconditions are executed in parallel. This enforces a parallel communication model for actors. When serial execution is desired, separate scripts and serial Script Groups are used.

Types of Scripts

Script Rule: a Script Structure of type Rule does not have instantiated sender and receiver actors, instead it refers to an actor using a symbolic name or an expression which evaluates to one actor address. This can be done by creation, reuse or an actor operation returning, at most, one actor address. A Script Rule has empty Sundo and Rundo fields because it is not an executed script; therefore, there is no "undo information" to maintain.

General Script: a Script Structure of type General uses Audit expressions to specify its actors. Sender and Receiver constitute two Audit expression which produce a set of couples of actor addresses (Sender Address, Receiver Address). A General Script has empty Sundo and Rundo fields.

Script Instance: a Script Structure of type Instance results from the instantiation of a Script Rule or a General Script. For a Script Rule, when sender and receiver actors are identified by their addresses, a Script Instance is created where Sender and Receiver are replaced by these addresses. For a General Script, a set of Script Instances is created corresponding to each couple of actor addresses. A Script Instance has non-empty Sundo and Rundo fields after it has been executed. These fields describe operations that must be completed to reverse the effect of executing the Script Instance once.

Script Group: a Script Structure which directly refers to a set of Script Structures. For example, a General Script can be instantiated into a Script Group if the Audit process returns more than one actor couple (e.g. communication broadcasting). Script Instances are also automatically grouped by the inference engine (SoftCoder) for parallel execution. Groups can also be defined to force the execution of Script Rules on the same processor. An instantiated Script Group has non-empty Sundo and Rundo fields.

Wait Script: a Script Structure generated by the SoftCoder to delay execution during a simulated-time interval. This is necessary because there may not be any script that can be executed during a certain period of simulation time. For example, a message that is sent may take several simulated-time units before it is received and can be processed. Or a message may be received but cannot be processed until later.

Undoable Script: a Script Instance or a Wait Script which has been executed and has the necessary Sundo and Rundo expressions to be reverse executed (undone). An Sundo or Rundo expression removes from the corresponding actors data-space all slots and values that were changed after the simulation time when the Script Instance was initially executed. The slots and values that existed before the Script Instance executed are thereby restored.

DESCRIPTION OF THE GRAS SYSTEM

FIG. 1 is an architectural diagram of the GRAS system. Video Studio Metaphor (VSM) Interface module 100 is a software module for providing a simple user interface and direct access to the entire system design and simulation environment under a single unified metaphor. The VSM lets the user record examples of system behavior into tape scenarios using visual programming techniques, and combine and refine these examples into tape programs while maintaining visual feedback about the specified system behavior via graphical animated simulation and execution. The VSM lets users capture, communicate, edit and combine designs via the use of Video Connectors and various editors (Film Editor).

The VSM Module also calls appropriate lower level GRAS modules to perform required tasks for a user of the system. The next level of modules comprising a Management of Visual Object Networks (MoVon) module 110, a software video recorder (SoftCoder) module 120, and a Video Connector (VC) module 130, are transparent to the user. The VSM Interface communicates with these modules over bidirectional message links (111, 121, and 131).

Management of Visual Object Networks (MOVON) is an implementation of actors that supports visualization of system components and networks of components in multiple views, multiple hierarchies and multiple levels of detail. The MOVON module 110 calls upon an Actor Frame (AF) module 140 and a PreScript module 160 to perform its functions.

Software Coder (SoftCoder) module 120 is a virtual machine to record and simulate or execute actor transactions and communications. The SoftCoder module 120 provides a general mechanism to record (enter), play (execute) and undo (reverse execution) specifications supplied by simple or composite screen interactions. These interactions represent communications between actors with information transfer and computation. The SoftCoder virtual machine processes a Tape Program describing Rules of Behavior between actors, instantiates actors and rules and produces a Tape Scenario that is a complete trace of the system execution. At each execution step in a Tape Program, a set of computations is performed. Each step can be reversed by "undoing" it.

A SoftCoder virtual machine also captures and simulates actor communications, and state changes. During recording, the SoftCoder automatically encodes software segments into general Rules of Behavior from the specific examples provided by the user through visual and menu interaction (recording of actor transactions). Each Rule of Behavior may be interactively refined via a group of special purpose software routines interacting with input from the user (Special Effects), and can easily be reused and changed when recording different situations.

The sequential execution of each step replays the example as it was input. The behavior described by the example may be interactively refined into a program for describing behavior in all foreseeable situations. The actors and Rules of Behavior can be edited at any time to change, to delete or add other information about the state of the actor, the computation performed and the information exchanged during a communication. At the user's discretion, actor state and graphical representation changes may be either permanent or temporary (reversible). The resulting rules actually form the Tape Program.

The video Connectors (VC) module 130 provides a mechanism to a user for program interaction and editing and connections to file systems and other systems external to GRAS. The VC module 130 is a general translation and communication mechanism for the internal tape representation used by the SoftCoder. The VC module is used to present tapes, actors and scripts in a textual format that is readable and editable by the user or can be communicated to external systems. The VC module provides a bidirectional connection mechanism between GRAS and file systems and a bidirectional connection between the GRAS and external systems. Examples of connectors provided: OOScripts, Messages, Tapes, Actors (Objects), Scripts, Icons. When connected via a VC to an external system, the external system can probe the GRAS system as well as remotely control the execution of GRAS.

PreScript is a graphical programming language, that is part of the GRAS system, for display and animation of actors and communications. The PreScript module 160 supports the visual representation of actors. Visual objects are associated with frame representations to define actors (actor=visual object+frame+behavior). A visual object is displayed on a computer terminal. It can be merged with other visual objects and is a member of a tape defining a scenario (or set of scenarios) as well as a member of a tape frame. The PreScript module 160 uses windowing and graphics capabilities 170 provided by the OS 175.

The Actor Frames (AF) module 140 is a knowledge representation and storage mechanism that supports time history of frames and actors knowledge. AF is based on the Frame Object Language and Implementation Environment (FOLIE), a frame representation language that is part of the GRAS system and supports frame base splitting (distribution) and frame base reconstruction from distributed subsets via merging, multiple hierarchies and local class precedence lists, and message broadcasting in multiple hierarchies. Where the message broadcasted comprises a reference to a method, a function, a procedure, or a lambda expression in compiled or interpreted form that is called with at least one functional argument: the current frame in the hierarchy. A lambda expression is a stand-alone computer code segment comprising all environment variables necessary to its execution, assuming it is invoked with the required arguments (e.g. the current frame).

In the GRAS system, the execution mechanism of a tape is based on the dynamic attributes of actors. Tape editing operations have an effect on a combination of dynamic and static attributes of actors. Static editing flexibility is supported by the FOLIE module which is part of AF module 140. The FOLIE module comprises the following functions: (1) symbolic self description, extensible, no type specificity; the symbolic self description of a frame set is order independent; all dependencies between frames are automatically maintained using dual links, defining a frame set from its frame elements can be performed in any order; (2) multiple inheritance, wherein a frame can inherit the union (set) of properties from all its parents; (3) multiple hierarchies of inheritance, wherein a frame can inherit properties from the AKO hierarchy, or the PART-OF hierarchy, or any other relationship; (4) local class precedence list (LCPL) comprising an ordered set of parents to a frame in a given hierarchy; multiple hierarchies provide for multiple LCPLs; (5) frame broadcasting, wherein an operator can be broadcasted to all local class precedence members in any given hierarchy; (6) frame network integration, wherein a frame is defined within a network of relationships with other frames; each frame is self describing, i.e., a frame symbolically describes its relational network with others, frame integration is possible even when other frames are missing; (7) frame network merge, wherein two frame networks sharing frame objects are automatically merged when linked (loaded) in the same system; (8) frame merging provides four types of merge primitives: reuse, combine, overwrite and forget; (9) frame transfer provides for global substitution of a frame by another one while preserving the frame network consistency; if the replacement frame already exists, the transfer is performed via merging; this function provides support for actor replacement and actor merging.

A windows and graphics system (WG) module (170) (similar to commercially available X Windows System ™, Sun View ™, Symbolics GENERA ®  windows) provides visual capabilities for GRAS. Common Lisp (CL) (180) is an implementation of the Common Lisp language according to the specification of the ANSI X3J13 committee (American National Standard for Common Lisp under preparation). For GRAS, a subset of CL is used to reduce the size of the executable. The CL subset comprises only the necessary LISP functions to execute GRAS and is generated by traversing the entire GRAS code and collecting all functions referenced in the code. Other computer languages may be substituted for CL as long as they provide analogous capabilities as defined by the ANSI specifications.

The Operating System (OS) 175 is a computer operating system and an (optional) integrated environment (e.g. UNIX ®, Symbolics GENERA ®). UNIX is a registered trademark of AT&T. GENERA is a registered trademark of Symbolics Inc. The OS controls and maintains the execution of the following components: WG (170), CL (180), FS (185) and NW (186).

File System (FS) (185) is a component implementing the access mechanism for static data storage and retrieval. It is based upon the UNIX file system.

Hardware (HW) (176) is a computer machinery comprising one or more processors to manipulate data (symbols, objects, databases) and to perform logical operations and arithmetic computations, and one or more storage mechanisms and devices used to store and retrieve data (the storage is static and dynamic, with sequential and/or random access). The hardware requirement is to provide sufficient data storage and computation power to support the execution of all the GRAS components defined here. Computer hardware currently available that were found suitable for the implementation and delivery of a GRAS include: AT&T 6386 WGS, other UNIX computer mainframes with AT&T 730 graphics terminal or X windows terminals, Sun Microsystems SUN-3 and SUN-4 series, Intel 80386 based personal computers, Symbolics 3600 ® and XL series, Xerox 1100 series, Texas Instruments Explorers ®, and Digital Equipment Corporation DEC 2000 and 3000 series.

Network (NW) (186) (optional) comprises the hardware and software components available-with or added-to the HW component to provide data communication between a set of VSM-based systems. Suitable network technologies currently available include: phone lines with modems, Ethernet TM AT&T STARLAN, broadband packet networks. The NW component is only required to communicate VSC data electronically (e.g. remotely accessing a tape program).

As shown in FIG. 1, the VSM module 100 has bidirectional connections to MOVON, SoftCoder and VC. The direct connection (from VSM) represent user control and access to: 1) the visual representation of actors and actor operations (MOVON),2) the visual recording, refinement and simulation of scripts and tape programs (SoftCoder), and 3) external tape programs as well as the editing of tape programs in textual form (VC). Not represented on the figure is a (optional run-time) bidirectional connection existing between VC and external systems. The connections back to VSM (from MOVON, SoftCoder or VC) represent visual and textual feedbacks to the user interface display resulting in changes to one or more visual representations on the display screen. This feedback-loop is actually implemented via the common path through MOVON-PreScript-WG, all graphical changes are implemented as changes to the visual representation of actors. VSM is also connected through WG to the pointing device and the keyboard device controlled by the user. The VSM module receives direct input from the user who is not represented on the figure. Equivalent input can be received from an external system via the VC remote control feature. SoftCoder and VC transmit scripts, tape programs and tape scenarios as well as SoftCoder control commands (e.g. load tape, remove tape, change level of detail, change view). MOVON and SoftCoder transmit actors and actor contents. MOVON can request actor visual objects from PreScript and actor frames from AF. SoftCoder can request frames and frame instances, and tapes and scripts structures from AF. VC can request connections to FS and external systems via CL and FS or NW. PresScript can request display changes via WG and request allocation (optionally reclamation) of PreScript objects via CL. AF can request allocation (optionally reclamation) of frames, scripts and tapes structures via CL. CL can request allocation and reclamation of computer objects from HW via OS and FS.

To further illustrate the connections between MOVON, SoftCoder, VC, and other components of the architecture, the language of the VSM can be used. When a tape program is rented from a video store (user request via VSM), VC opens a connection to FS or NW via CL and SoftCoder records input from the open connection into a tape program that is placed on a tapeshelf (VSM). When a tape is loaded into the SoftCoder (VSM command), SoftCoder request actors and display views from MOVON, then SoftCoder invokes the appropriate execution algorithm. As SoftCoder executes scripts from the tape program, changes are ordered to actors that are 1) controlled in time history by AF and 2) may affect the visual representation of actors (e.g. animation) via MOVON-PreScript-WG. When the user pauses the execution to make changes or tries execution alternatives, changes are translated into script changes and actor changes and propagated to MOVON and AF where they are temporarily or permanently installed. Changes to actors and scripts are immediately visible as the SoftCoder executes the changes and propagates them via MOVON.

In the Video Studio Metaphor, example scenarios are interactively recorded into tapes. Example Scenarios are used to specify a thread of behavior for an existing system or a system to be designed. Tape Scenarios are interactively refined to incorporate new aspects of the system behavior for new conditions and evolve into a Tape Program for all allowable conditions. After sufficient refinement, a Tape Program provides a complete simulation of the system represented or being designed. A Tape (Scenario or Program) contains a set of actors and a set of rules describing behaviors and communications between actors. Actors are processing agents involved in communication and computation activities that are driven by the execution of rules. An Actor provides an independent knowledge base used for the execution of rules. Rules incorporate preconditions relating to facts in actor knowledge bases, communications between actors, and postconditions comprising computations and assertions to actor knowledge bases.

Actor Frame Module

The frame architecture allows users to integrate two independent tapes by "loading" and "gluing." Two tapes sharing actors and rules can be integrated by loading them into one environment and applying tape gluing and editing. Two tapes sharing roles and functions but conflicting actor identifications can be merged by performing actor translation (selecting actor replacements) and the above step. Several users building piece-parts of the same feature specification find unique computer assistance for integration in such environment.

The flexibility of the tape editing and merge features results from the integration of three components: the frame representation language (FOLIE), the Management Of Visual Object Networks (MOVON) and the underlying script language (e.g. OOScript) used to define rule-based behavior of actors. Frame merging supports the merge of tapes and/or actor slots, values and relations (e.g. inheritance, membership relations). If a set of frames and their relationships is represented using a graph where the nodes represent the frames and the arcs the relations, then merging two such sets of frames is equivalent to composing the graphs by merging nodes from each graphs and adding or removing (depending on the type of merge) arcs between nodes of the combined graph. An actor replacement operation, which can be seen as an extension of "becomes" in object-oriented languages, can be used to substitute an actor by a new one or merge the two actors if the destination of the replacement is an existing actor. Visual object merge supports integration of system components i.e., merging states defined as slots and values, and graphics attributes. Rule based tape program execution supports integration of actor behaviors from various tapes by performing rule-sets union. Combining programs by a set union of functions, objects or instructions in standard programming language does not usually produce any useful or meaningful result because the execution of each program instruction is conditioned by external implicit control flow defined by other surrounding program instructions. However, combining tape programs by set union of Script Rules and General Scripts and related actors can yield to the addition of functionalities from the tapes being combined with at least two advantages. First, each tape program "instruction" is a Script Rule or a General Script comprising actors or actor descriptions, execution conditions and resulting computations and communication (message) and is therefore a stand-alone program instruction. Second, if two Script Rules from different tape programs being combined are conflicting, the conflict is of a well defined type: 1) the rules may be semantically contradictory, 2) there may be situations where both rules will attempt to update the same actor slot at the same time, 3) or one or more of the rules may be unreachable. The first two conflict cases will appear visually during the animation and simulation of the combined tape program execution, the second and third conflict case can also be detected using static analysis of the combined rule set.

In GRAS, the underlying knowledge representation combining FOLIE, MOVON, and the internal Script Structure (e.g. OOScript) provides unique flexibility of use that is internally based on the merge operations described above (frame graph merge and behavior integration by rule-sets union).

The basic knowledge representation supporting all data storage and retrieval for the VSM is provided by the AF component of GRAS. AF provides a time history mechanism, required for the reversible execution of communication scripts between actors, that is built on top of the underlying frame representation language, FOLIE. AF provides the necessary time history mechanism for actors (formalized earlier) by saving local snap-shots of the actor's frame each time a communication to or from that actor changes some attribute or relation of the frame. Besides this time history, all features of AF required for the implementation of GRAS are direct features of FOLIE.

The execution mechanism of a tape in the VSM is based on storing and restoring dynamic attributes of actors. The tape editing operations described earlier have effects on a combination of dynamic and static attributes of actors. The implementation of changes and editing is directly supported by the underlying frame representation language, FOLIE. The implementation of dynamic changes is provided by a combination of FOLIE properties and the history mechanism that can store and restore snap-shots of frame attributes related to an actor. The important features of the FOLIE frame language that support the required operations on static and dynamic attributes of actors include:

Symbolic self description: a frame can "print itself" using a symbolic description format that is independent from the computer environment where the frame is defined. The self description format is extensible: when the frame changes the same format is used in extended or shortened form to incorporate the changes. There is no type specificity in the format that could be computer dependent. The symbolic self description of a frame set is order independent. Given a set of frames {f1, f2, ..., fn}, it is possible to store the self description of this set of frames in any order and restore them in different order in another instance of a GRAS system to create an equivalent frame set.

Dual links: all relationships between frames are automatically maintained using dual links, restoring one half of the dual link is equivalent to restoring the whole dual link. This property supports the order independence of self description in frame sets.

Frame networks: a frame can be interpreted as a network of relationships with other frames. Each frame symbolically describes its relational network with others, frame integration is possible when other frames are missing. It is therefore permissible to store and restore an incomplete network of frames: that is a set of frames, $F=\{f1, f2, \ldots, fn\}$ where fi, a member of F refers to fj which is not a member of F.

Multiple hierarchies of inheritance: a frame can inherit the union (set) of attributes and relations from all its parents in a given frame hierarchy. While multiple inheritance is commonly available with other frame languages and object-oriented languages, multiple inheritance according to multiple hierarchies is a novel feature of FOLIE. A frame can inherit properties from the AKO hierarchy, or the PART-OF hierarchy, or any other relationship defined in GRAS. Each dual relationship defines its own frame hierarchy.

Local class precedence list (LCPL): constructs an ordered set of parents to a frame in a given hierarchy. Multiple hierarchies provide for multiple LCPLs.

Frame broadcasting: an operator, or a function can be broadcasted, being applied to all members of a LCPL in a given hierarchy.

Frame merge: is a mechanism to combine and reuse information stored in frames. Frames can be merged via four basic merge primitives: reuse, combine, overwrite and forget. When merging two frames f1 and f2 to construct a frame f(1+2):

1). reuse: f(1+2) inherits from f1 and f2 with precedence on f1. The attributes and relations of f1 remain and non overlapping attributes and relations from f2 are added.

2). combine: f(1+2) inherits from f1 and f2 with equivalence. The attributes and relations from f1 and f2 are stored as union sets into f(1+2).

3). overwrite: f(1+2) inherits from f1 and f2 with precedence on f2. This is identical to merge with reuse between f2 and f1.

4). forget: f(1+2)=f2. The merged frame is replaced by the original frame f2.

Frame transfer: provides for global substitution of a frame by another one while preserving the frame network consistency, thus maintaining existing dual links. If the replacement frame already exists, the transfer is performed via merging. This feature directly supports actor replacement, cloning and merging described earlier.

Frame network merge: two frame networks sharing common frames are automatically merged when restored in the same VSM based system.

The flexibility of tape editing and feature merge in GRAS results from the interaction between the three main components of the architecture: the frame representation language integrating time history (AF and FOLIE), the Management Of Visual Object Networks (MOVON) component and underlying properties of the Script Structure used to represent rule-based behavior of actors (SoftCoder). The following examples illustrate the integration of these software components:

1). Frame merging supports static or dynamic merge of tapes, actors and relations (e.g. inheritance, membership, sub-components). This type of merge is identical to a graph merge where each graph is a tape linked to Script Structure describing actors behavior, linked to actors, linked to sub-component actors, etc.

2). A general actor replacement operation can substitute an actor by a new one or merge two or more existing actors. This provides for actor replacement, cloning, merging and support user experimentation with new design components.

3). Visual object merge supports the integration of system components and their graphical representations and gives direct visual feedback to the user when replacement, cloning or merging takes place.

4). Rule based communications between actors as provided by the Script Structure and their execution by the SoftCoder supports features and components integration from multiple tape programs by performing rule-sets union.

In GRAS, the underlying knowledge representation combining AF, MOVON, and the SoftCoder provides novel flexibility of use and experimentation with system design. It is possible to simulate, combine and analyze existing and new designs in a very accessible and user friendly way. The flexibility of use is largely a result of the unique and semi-automated assistance for such operations as merge and integration of rules of behavior provided by the interaction of the three basic components of the GRAS architecture: AF, MOVON and SoftCoder.

FOLIE

The following is a description of the Frame Object Language and Implementation Environment (FOLIE). For purposes of clarity, a Lisp-like syntax adapted from Common Lisp (G. L. Steele Jr., *Common Lisp the Language*, Digital Press, 1984) is used herein to define FOLIE, and several examples are included. The FOLIE operators defined herein are named with naming conventions similar to Common Lisp and the Common Lisp Object System Specification (CLOS) (D. Bobrow, "CLOS," Xerox document 87-002, 1987 and S. E. Keene, *Object-Oriented Programming in Common Lisp, A Programmer's Guide to CLOS*, Addison Wesley, New York, 1989). The definition of Local Class Precedence List in FOLIE is inspired from the definition of Class Precedence List in CLOS.

1). Notations and Definitions:

Let FUN1 (ARG1 ARG2) be a declaration of FUN1 to be a function of two arguments, ARG1 and ARG2.

Let "&optional" declare optional arguments and "&rest" declare the collection of all remaining arguments to a function.

Let "&optional (DEPTH 0)" be a declaration for an optional argument named DEPTH with default value 0.

Let (FUN1 ARG1 ARG2) be a function call expression representing the invocation of a function FUN1 on arguments ARG1 and ARG2.

The arguments can themselves be function call expressions, providing a representation for embedded function calls.

Let::=be the "bind" symbol so that VAR::=(FUN1 ARG1 ARG2) indicates that VAR is bound to the result of the function call.

Let=be the "equality by definition" symbol.

Let->be the "value returned" symbol. For example: if V1::=123 then V1->123.

Let F be any Frame Object identified by a unique Lisp object (e.g. a symbol).

Let FB be any Frame Base, where FB is a structure comprising a set of Frame Objects.

Let MFB (Multiple Frame Base) be the general type (class) of frame base objects defined in FOLIE.

Let NX be a sequence of n slots NX=(X1 X2 ... Xn), let X=Xi be a slot in NX, let BNXi be the subsequence of NX before Xi and let ANXi be the subsequence of NX after Xi (ANXi and/or BNXi can be the empty sequence ()). We have: NX=BNXi|(X)|ANXi where|represents the concatenation of sequences.

2). Frame Base Creation:

MFB (&rest F-set)-Create a simple frame base that is a collection of F frame objects.

Example:

(MFB F1 F2 F3)->(F1 ... F2 ... F3 ...) indicates that the frame base contains F1, F2 and F3.

3). Multiple Frame Base Creation:

MAKE-MFB (&optional FB F NX-set (MERGE-TYPE: COMBINE))-Frame and frame base creation and merge. Where all arguments are optionals, where NX-set is a set (sequence of) NX, where MERGE-TYPE is one of (:REUSE: COMBINE: OVERWRITE: FORGET) as defined earlier and where the default value of MERGE-TYPE is: COMBINE.

Examples:

FB::=(MAKE-MFB) creates an empty frame base.

(MAKE-MFB FB F) adds the empty frame F to the frame base FB.

(MAKE-MFB FB F (NX1 ... NXp)) adds the frame F comprising the set of sequences of slots (NX1 ... NXp) to FB.

If F is already a member of FB then (NX1 ... NXp) is merged by combination with the existing frame F.

(MAKE-MFB FB F (NX'1 ... NX'p): FORGET) replaces the existing definition of frame F by a new one.

4). Accessors and Assertors:

GETMFB (&optional FB F &rest NX)-accesses the NX slot description of frame F in FB.

GETMFB (&optional FB F &rest NX)::=VALUE-add VALUE at the NX location for frame F. Adding the empty sequence ( ) as value is equivalent to removing the current value frame at location NX in F. Adding the true frame statement T as value of GETMFB is equivalent to asserting NX in F. It should be noted that if VALUE is not ( ), it is added to F by creating a local frame containing the given value (a value frame) and that the "addition" of a value is done by merging. Therefore, in FOLIE, a frame base is a multiple frame base in the sense that each sub-component of it is a frame base.

If should be noted that:

{(GETMFB FB F X1 ... Xn)::=T}=(MAKE-MFB FB F (X1 ... Xn))

Examples:

(GETMFB FB F X1 X2)::=VALUE12 then: (GETMFB FB F X1 X2)->(VALUE12 ...) this indicates that at slot location (X1 X2) in frame F of FB a value frame exists that now contains the value VALUE12 and possibly other previous values.

(GETMFB FB F X1 X2 VALUE12)->(T) indicates that at slot location (X1 X2 VALUE12) there exists a true value frame (a non empty frame).

(GETMFB FB F X1)->(X2 (VALUE12 ...) ...) indicates that at slot location (X1) in frame F there exists a value frame that contains at location (X2) a value frame containing VALUE12.

(GETMFB FB F X1 X2)=(GETMFB (GETMFB FB F X1) X2)

(GETMFB FB F X1 X2)=(GETMFB (GETMFB (GETMFB FB) F) X1) X2)

(GETMFB FB F X1 X2)::=NEWVALUE (GETMFB FB F X1 X2)->(NEWVALUE ... VALUE12 ...) indicates that both values are now members of the value frame at location (X1 X2) in F.

(GETMFB FB F X1 X2 VALUE12)::=( )

(GETMFB FB F X1 X2)->(NEWVALUE ...) indicates that VALUE12 is not a member of the value frame at location (X1 X2) in F.

(GETMFB FB F X1 X2 VALUE 12)->( )

5). Multiple Assertors:

When the frame or one of the slot argument of GETMFB is itself a frame base, and GETMFB is invoked for an assertion, then the assertion is multiplied and distributed to all members of the frame base argument.

Examples:

Let X::=(MFB A B C)->(A ... B ... C ...) with NX=BNX|(X)|ANX

Then:

{(GETMFB FB F NX)::=Y}={(GETMFB FB F|BNX|(A)|ANX| and
(GETMFB FB F|BNX|(B)|ANX| and
(GETMFB FB F|BNX|(C)|ANX|)}

(GETMFB FB F |NX|::=( ) removes all three assertions.

In particular:

(GETMFB FB FB |NX)::=T asserts NX to all frame element of the frame base FB.

(GETMFB FB FB)=(GETMFB FB) and (GETMFB FB FB)::=( ) removes all facts from all elements of FB 6). Relationship Accessors and Assertors:

A sequence of slot NX can be used to specify any symbolic relation between frame objects. In particular, dual relationships can be defined in FOLIE using multiple slot sequences using the following syntax:

Let:> be the "forward" link symbol

Let:< be the "backward" link symbol then (GETMFB FB A:>B)::=T asserts a dual relationship between frame A and frame B in the frame base FB. All operators on frame objects defined in FOLIE maintain duality of relationships by enforcing the equivalence relation defined below.

Let FB be the current frame base.

Let (GETMFB FB NX)::=T be represented to the short-form [NX]=X1 X2 ... Xn to indicate that the assertion NX is true in the frame base FB.

Let <=> be the equivalence symbol.

Let (MFB A B C) a frame base comprising A, B and C as elements be represented by the short form (A B C). Then the following assertions about relationships in FOLIE are true:

a) direct relation equivalence:
A:>B<=>B:<A b) many-to-one-relation distributivity:
(A B):>C<=>{A:>C and B:>C} c) sink-relation distributivity:
FB:>OMEGA<=>for all F in FB {F:>OMEGA} d) one-to-many-relation distributivity:
A:>(B C)<=>{A:>B and A:>C} e) totology-relation distributivity:
ALPHA:>FB<=>for all F in FB {ALPHA:>F} f) N-ary relation equivalence:
A X1 X2 ... Xn:>Z<=>Z X1 X2 ... Xn;<A and the assertions a) through e) above are true for N-ary relations as well.

Example:
(A B C) CONNECT SATELLITE:>VEGA
<=>{A CONNECT SATELLITE:>VEGA
and B CONNECT SATELLITE:>VEGA
and C CONNECT SATELLITE:>VEGA}
<=>{VEGA CONNECT SATELLITE:<A}
and VEGA CONNECT SATELLITE:<B
and VEGA CONNECT SATELLITE:<C}

7). Set Operators:

Let FB be the current frame base used as a "root" to assert all dual relationships during the following operations.

MFB-MERGE (TYPE FB1 &rest FB-set)-Merge a set of frame bases FB-set into FB1 (changing FB1) according to TYPE a member of (:REUSE:COMBINE:OVERWRITE:FORGET).

MFB-INTERSECTION (FB1 &rest FB-set)-Change FB1 to become the intersection of itself (its assertions) with (all assertions from) a set of frame bases.

MFB-DIFF (FB1 &rest FB-set)-Remove from FB1 all assertions from a set of frame bases.

MFB-TRANSFER (FB1 FB2)=MFB-MERGE (:REUSE FB2 FB1)-Use of merge equivalent to adding all assertions from FB1 that have no similar in FB2 into FB2.

MFB-UNION (FB1 &rest FB-set)=MFB-MERGE (:COMBINE FB1 &rest FB-set)-Use of merge equivalent to set union of all assertions from the set of frame bases.

MFB-REPLACE(FB1 FB2)=MFB-MERGE (:FORGET FB2 FB1)-Use of merge equivalent to replacing FB2 by FB1 in the frame base.

MFB-XOR (FB1 &rest FB-set)-Change FB1 to become the set of assertion that are pair-wise not true for both FB1 and each frame base in FB-set.

8). Predicates:

MFB-INCLUDE-P (&rest FB-set)-Is true if FB-set is an ordered set for the inclusion relation. For example (MFB-INCLUDE-P FB1 FB2)->T means that FB1 is equivalent to a sub-frame base of FB2: all assertions true in FB1 are also true in FB2.

MFB-MINIMAL-P (FB)-Is true if no assertions exist that are true about FB. For example:(MFB-MINIMAL-P (MAKE-MFB))->T.

MFB-EQUAL (FB1 FB2 &optional DEPTH)-Is true if both (MFB-INCLUDE-P FB1 FB2) and (MFB-INCLUDE-P FB2 FB1) are true.

Note: the optional argument DEPTH is provided here and below for efficiency of certain operations. A default DEPTH of 0 indicates that the entire frame base is explored. A default DEPTH of 0 indicates that the first level of the frame base is explored. When DEPTH is a number, it indicates the maximum size of the NX slot sequences explored minus 1.

9). Utilities:

MFB-COPY (FB &optional DEPTH)-Make a copy of FB.

MFB-CLOSE (FB &rest FB-set)-Close all dual links (using FB as reference for each dual link closed) for the frame bases in FB-set. This function is used internally by other functions such as MFB-READ.

MFB-PRINT (SUBFB &optional STREAM DEPTH)- Give a symbolic representation of the frame base SUBFB. SUBFB can be a subset of FB or the entire frame base FB. If STREAM is specified, it is used to print SUBFB to the corresponding STREAM device.

MFB-READ (FB &optional STREAM DEPTH)-Read a symbolic representation of a set of frame bases from STREAM and merge the resulting frame bases into FB.

10). Mappers:

MAP-MFB (FCN FB &optional (DEPTH 0))-Apply the function definition FCN to all slots and values of FB up to DEPTH.

MAP-MFB-SLOT (FCN FB &optional (DEPTH 0))- Apply the function definition FCN to all slots of FB upto DEPTH.

MAP-MFB-VALUE (FCN FB &optional (DEPTH 0))-Apply the function definition FCN to all values of FB upto DEPTH.

11). Local Class Precedence Lists (LCPL):

The definition used for LCPL is inspired from the CLOS specification (Common Lisp Object Specification). Wherein CLOS, CPLs are defined for a single inheritance hierarchy (as provided with Object Oriented Languages), LCPL is defined in FOLIE for any hierarchy specified by an N-ary relation (defined by NX).

MFB-LCPL (FB F NX &optional DEPTH)-Return an ordered set of frame objects that constitute the class precedence hierarchy of F in FB local to the hierarchy relation specified by NX. If a number, DEPTH is the number of successive NX relations explored.

Example:

Let FB be such that the following assertions (in shortform) are true:

ABCD

ABCD1

DBCE

EBCE1

E1BCZ then the local class precedence list for A in FB with relation (B C) is:

(MFB-LCPL FB A (B C))->(A D D1 E E1 Z)

When looking for an inherited attribute of A for relation (B C) one looks successively in (A D D1 E E1 Z) for this attribute. The search for an inherited attribute is done using MFB-BROADCAST defined below.

12). Function Broadcasting:

MFB-BROADCAST (FCN FB F NX &optional DEPTH)-Apply the function definition FC to the frame object F and all its precedents in the hierarchy defined by NX in the frame base FB.

MFB-BROADCAST-COLLECT (FCN FB F NX &optional DEPTH)-Similar to MFB-BROADCAST but collect the results of applying FCN to all precedents of F in the hierarchy.

PreScript

Visual programming of systems behavior and interactive/dynamic/flexible editing in an interactive actor and rule-based environment like GRAS is made possible by a specific definition of visual objects. An actor frame structure is optionally augmented with a visual object to implement visual representations of actors in GRAS, that is:

Actor = D(A,t) = Base-Frame + {Visual Object} + - {Behavior} and this actor is fully specified by its data-space description at time t, D(A, t).

However, the data-space description can be broken-up into a visual object component, a basic frame description and set of behavior specifiers from which the inherited set of possible behaviors at the current time (possibly empty) can be derived.

A visual object is self displaying and self describing, can be merged with another visual object and can have a variety of visual representations (e.g. icon, text, button, geometrical shape, combination of graphical primitives). Moreover, a visual object associated with an actor can be a direct member of a tape. The frame corresponding to the visual object is also linked to the tape frame. Therefore, an actor may have two links with each tape instance it is used in, a link between the tape and its visual object and a bi-directional link between its frame description and the frame description associated with the tape.

Underlying the visual objects representation is the PreScript graphics language. PreScript uses a prefix notation, and a Lisp-like syntax as well as a PreScript interpreter, a compiler and a debugger. PreScript is a direct implementation of vector space algebra in two, three or more dimensions extended to include the definition of a pointing device (e.g. mouse, cursor) and mechanisms to capture user input and provide output mechanisms.

The PreScript implementation includes definitions for vectors, norms, distances, vector operations (scalar product, addition, subtraction, vector product), orthogonality, parallelism, points, lines, planes, hyperplanes, projections, perspectives, geometric primitive objects (line segments, line paths, conics, polygones, parallelepipeds, cylinders, surface models), spatial location primitives (inside, outside, intersection, union, membership relations, hidden surfaces), linear and affine transforms, similitudes (rotations, translations, scaling, point symmetries and plane symmetries). The PreScript graphical language also includes definitions of display devices, multiple viewpoints, textures, colors, character styles (fonts), input/output devices for text and coordinates, images (arrays of graphical elements), tiles, graphical periodicity and recursion.

When an error occurs during the execution of a PreScript command, an error message is returned, and printed in an Explanation View, and the execution of the current PreScript expression is aborted, however this does not arrest PreScript execution. Errors in drawing are never fatal in the sense that an error in displaying a given PreScript object does not prevent the following PreScript object from being displayed; however the second display result may be incorrect if it depends on the first one.

A PreScript object is a well formed PreScript expression comprising PreScript operators and arguments including typed arguments (e.g. numerical) and symbolic argument assumed to be bound in a hypothetical evaluation environment. A PreScript object can be a combination of PreScript primitives. A visual object is defined by combining four PreScript elements comprising:

P=(d, e, i, s), wherein d="drawing", e="exterior", i="interior", and s="sensor", and four sensor methods (user-interaction behaviors): S=(in, ex, bc, ac), wherein in="sensor entry method", ex="sensor exit method", bc="before-click method", and ac="after-click method".

The Prescript elements are defined as follows: Drawing (d) is a PreScript object describing how to draw the visual object (independently from the display device) and an optional transformation function to provide animation from the initial drawing. Exterior (e) or mask is a PreScript object with a well defined interior used to delimit the visual object representation in a given view. Interior (i) or extent is a PreScript object with a well defined interior used to delimit the virtual interior of the visual object. Sensor (s) is a PreScript object with a well defined interior used to delimit an area sensitive to the positioning of a pointing device.

Figure 4:
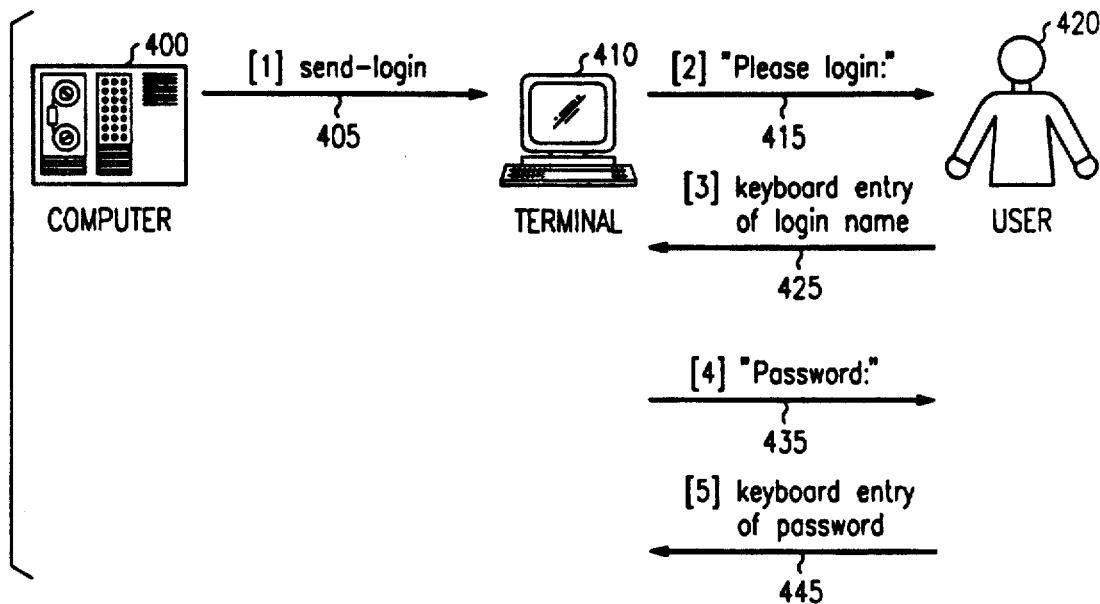
FIGS. 4 and 5 are diagrams illustrating the GRAS system display after simulating the computer login sequence.

The following is an example of a PreScript object as illustrated by the user actor 420 in FIG. 4:

```
                    (set P1 environment
        (let        ((x 806)
                    (y 276)
                    (w 88)
                    (w/2 44)
                    (h 94)
                    (h/2 47)
                    (icon (get-icon "Margaret"))
                    (name "user"))))
        (define-PreScript P1 d1 e1 i1 s1)
        Where:
        d1 = (;; use two coordinate (x and y)
                    (set dimension 2)
                ;; move to the center of the visual object
                    (moveto w/2 h/2)
                ;; display icon
                    (blit icon (-(/w 2.3)) (-(/h 2.3)))
                ;; set the current display font
                    (set font helvetica 14 bold))
                ;; print name
                    (printo name (-(/w 3))(/h 3))
                ;; draw a box around
                    (edges (-w/2) (-h/2) w/2 h/2))
        e1 = (circle 0 0 (max w h))
        i1 = (edges (-w/2) (-h/2) w/2 h/2)
        s1 = (edges (-w/2) (/h 3) w/2 h/2).
```

This PreScript object P1 is drawn according to d1 in the let environment of P1 on the display device at a location centered around the x,y coordinates (806,276). The variable "icon" is displayed at the specified location. The variable "name" is used and printed at the specified location in Helvetica font (size 14, type bold), then a box is drawn. The exterior e1 is defined by the exterior of the circle centered at the coordinates of P1 and of radius 150. The interior i1 is the interior of a box of width "w" and height "h" centered at the coordinates of P1. And the sensor area s1 is delimited by a smaller box at the bottom of box i1 enclosing the display of "name".

The Sensor methods are defined as follows: A sensor entry method (in) is a method invoked when the pointing device enters the sensor area of the visual object. A default method is when the mouse enters a sensor area, the sensor region is highlighted. A sensor exit method (ex) is a method invoked when the pointing device exits the sensor area of the visual object. A default method is when the mouse leaves a sensor area, the sensor region is not highlighted. A before-click method (bc) is a method invoked when the pointing device is used to make a selection in the sensor area (e.g. when the mouse is clicked). Several default methods are available including coloring the sensor area or redrawing it, providing pointer-related motion of the visual object in the current view, changing a symbolic fact in the current evaluation environment, bringing a menu of operations on the visual object, or a combination of several methods. An after-click method (ac) is a method invoked when the pointing device selection in the sensor area is released. A default method is available to redraw the sensor area in the possibly changed evaluation environment.

Following the example of P1 above, the following defines a before-click method for P1 that changes the displayed name of P1:

```
(in P1 environment
    (define bc (left-button &rest ignore) (name)
        (cond (previous-name)
            (set name previous-name)
            (set previous-name nil))
    (t
            (set previous-name name)
            (set name "Margaret"))))
).
```

As a result of this definition and the above default definitions of the "in", "ex" and "ac" methods. When the pointing device enters the sensor area s1 of P1 (an invisible box around the display of "name"), the "in" method is invoked and the s1 box is highlighted. When the pointing device is used to make a selection in the sensor area of P1, the "bc" method of P1 is invoked that changes the value of "name" in the environment of P1 to "Margaret" (after storing the current value of "name" under a new variable called "previous-name"). When the pointing device is released the default "ac" method is invoked on P1 causing the PreScript element d1 to be executed in the (changed) environment of P1. P1 is therefore displayed as a box with the icon at the top and the word "Margaret" (the name of a specific user) printed in Helvetica font at the bottom. If the pointing device is used for a second selection inside s1, the name of P1 is changed to the value of the variable "previous-name" defined in the environment of P1, therefore the name "user" is restored as value of variable "name" in the environment of P1. The "ac" method invoked upon release of the second selection inside s1 causes the display of P1 to change back to a box with the icon at the top and the word "user" at the bottom. When the pointing device leaves the s1 area of P1 the "ex" default method is invoked and s1 is not highlighted.

Such click methods are used in GRAS to interactively design selectable visual representation of actors. Buttons, switches and various input/output visual objects are thereby provided. Actor composition is used to combine these features together into more elaborate system components, for example a phone object is built from a case actor, a set of push-button actors, a crystal display, and a handset.

Click methods when defined with arguments are selective on the type of selection performed via the pointing device (e.g. a left-button selection can be defined differently than a right-button selection). The current environment is used to form the evaluation environment for the click methods. The visual object, the current view, and the type of selection done in the pointing device are passed as arguments to these methods. In addition, given a visual object hierarchy (e.g. component relationship), if a visual object A is an inferior of visual object B in that hierarchy, then A has also access to the environment of B by using explicit reference to its superior attributes.

For example if a phone object Ph1 has a push-button PB1 sub-object, then in the environment of PB1, W is the width of the push-button and (SUPERIOR W) is the width of the superior of PB1, that is Ph1, the phone object.

The default click-method provides for motion of a visual object A in the current view V following the constraint function provided for A in view V. The motion is further constrained by the extent of the superior of A (in the component hierarchy). The top superior of A in the component hierarchy is the video monitor for view V where the motion of all actors in the present view is contained.

For example if a sub-object C1 (cursor) of Ph1 is in motion, the movement of C1 is limited to the interior region of Ph1 (the "i" element of Ph1).

An actor's PreScript evaluation environment comprises a combination of three environments.

1) An environment describing the local knowledge base of the actor:

(let a1 = v1, ..., an = vn, ...)

wherein "ai" denotes the symbolic name of a fact in the knowledge base and "vi" is the corresponding value or expression.

2) An environment describing referential characteristics of the actor:

(let self = vself, name = vname, iname = viname,
icon1 = vicon1, ..., x1 = vx1, x2 = vx2, ...
xp = vxp, ...)

wherein "self" (the actor itself) is bound to "vself," a unique identifier for this actor (e.g. its address); "name" is bound to the stage name of the actor, "iname" is bound to the internal name of the actor (or symbolic address); "icon1" is bound to "vicon1", an iconic representation, i.e., a symbolic identifier for an icon in an icon library, and is used to produce a visual image; "xi" are bound to the actor's ordinates in an absolute coordinate system of dimension p in a fixed absolute referential.

3) An environment defining a set of transforms and constraints on the actors visual representation and attributes for a set of views {viewj} j = 1, ..., q; defined for a given tape, comprising: (a) Different coordinates for different views:

T: {xi} -> (view1/t1({xi}), ..., viewq/tq({xi}))

T(viewj): {xi} -> tj({xi})

wherein tj is the transform function to obtain the coordinates of the actor in the j-th view based its absolute coordinates. If the transform is linear in a view, it can be expressed using a coordinate transform matrix Mj ({xi} = Mj {xi/viewj});

(b) Constraints on the displacement of coordinates in the set of views:

C: {xi} -> (view0/c0({xi}), view1/c1({xi}), ...,
viewq/cq({xi})))

C(viewj): {xi} -> cj({xi})

wherein cj is a constraint function for the actor coordinates observed in the j-th view. When a single constraint function c0 is provided to the absolute coordinate system, then it is assumed that there exist a linear transformation Mj to generate the q views and the constraint function used for each view is:

cj = c0 o Mj (c) A set of symbolic translation functions for all the views where the actor is represented:

viewj -> trj wherein trj transforms a symbolic characteristic from the actor environment (e.g. name, iname, icon) or the name of an element from its local knowledge base (ai) into a new name used in the j-th view, the default translation function being the identity.

An actor's visual representation in the j-th view is obtained by evaluating the first PreScript expression (drawing) of its associated visual object within the actor's PreScript environment knowing that the view is viewj. The actor's PreScript environment is also used to evaluate the three other PreScript objects (e,i,s) used to define the actor's visual object (respectively exterior, interior and sensor) and to invoke the appropriate sensor and click-methods during user interaction.

Graphical changes in all the views are directly derived from logical changes to the actor's knowledge base by PreScript evaluation in the actor environment at time t. The PreScript expression describing the graphical representation of an actor uses the let environment bindings (ai) of this actor. So the value of the "ai" slots are freely used to specify the PreScript elements (d,e,i,s) of the actors PreScript object. This property directly supports display changes that reflect changes in the actor's knowledge base implemented as the actor let environment. A graphical editor may automatically generate the code to associate and combine, using rules, these logical changes and graphical effects. In an alternate implementation, a database of relations between logical changes and graphical effects would be maintained. The user interface of the GRAS system was built using such visual objects (visual representations of actors). The flexibility of this representation is such that the interface to the system built with visual objects can be completely redesigned in a few of days. The environment can be set to edit its own interface, e.g. change buttons look and feel, add new buttons and corresponding commands. This is a first step in the process of redesigning a VSM-based system within itself.

During execution, the actors knowledge base history is automatically maintained by the SoftCoder, providing for completely reversible execution of graphics and states. Each actor has a history of changes of its attributes that is automatically maintained for each tape it is used in. The history is a record of effective changes, if the actor is not used in a tape, its history is empty for that tape. Changes to actor attributes can affect the graphical representation of the actor, and the only changes possible to an actor's visual representation during the simulation of a tape are via changes to its attributes. Therefore the history maintained is a sufficient mechanism to provide a complete record of both the actors internal attributes and its visual representation.

Communication Between Actors

Communication between actors is implemented via Script Rule execution by the SoftCoder. A communication includes transmission of information between actors and all computations accompanying the transmission. A degenerate case of communication involves transmission from an actor to itself and is equivalent to internal computation in the actor environment. Two modes of communication are defined: (1) communication with mutual agreement and (2) communication with delivery.

(1) Communication with mutual agreement: considering the case of a Script Rule execution with message transfer between two distinct actors, the communication is executed with mutual agreement when the preconditions of both sender and receiver actors are satisfied at the same time before the message is transmitted. The communication is also called synchronous and can be represented using:

$$P(S,R) > M(S,R) > Q(S,R)$$

where S is the sender, R is the receiver, P, M, Q are respectively the preconditions, message and postconditions. A synchronous communication is an atomic computation in the actor system.

(2) Communication with delivery: given a Script Rule, if the preconditions on the sender actor are satisfied before those on the receiver actor, the communication is performed via delivery. The sender actor issues a message constructed in the environment of the sender actor at the time of precondition satisfaction. The Script Instance is then marked using the script type "Sent", the SoftCoder queues the communication for delivery to the receiver actor, and the postconditions of the sender actor are executed. When the receiver actor precondition is satisfied, the message is processed by the receiver and the postconditions are executed. The communication is also called asynchronous and can be represented as:

$$P(S) => M(S, Sent) => Q(S)$$

(wait)

$$P(R) => M(Delivered, R) => Q(R)$$

using the previous notations. M(S, Sent) indicates that the message is constructed in the sender environment at the time it is sent. M(Delivered, R) indicates that at the time the message is received by R, the environment of R is temporarily augmented to include the environment from the message delivered, then Q(R), the postconditions of R are executed in this temporary environment.

In the general model of communication between actors, it is possible for an actor to send or receive and process several communications in parallel although if this is not desired for a given application, the Script Rules can be designed to avoid this problem. There is a possibility of conflict when the postconditions of an actor executed in parallel would result in multiple changes to the same attribute in the current actor environment. Such conflicts are easily detected at run-time and may be resolved using a technique acceptable for the target application (e.g. random choice, multiple values, change overwrite, error signal).

Another possible case of conflict occurs when a viewer removes an actor or changes the description of an actor during the execution of a Tape Program involving this actor. Should the change be local to the execution of a specific scenario or should the change be reported to the original description of the actor (global)! This conflict is resolved by prompting the viewer to choose between Local or Global change. If the change is local, only the data-space of A at the current time is affected as is the future history of A. If the change is global, the change is first made locally, and if the actor history is not empty, the change is also reported to the initial data-space description of A. If the change requires removing a set of Script Rules, depending on the actor that is being removed, the user is prompted for confirmation on removal of the rules and possibly, automatic rewinding of the Tape Program execution is performed to prevent unreachability conflicts.

During the execution of a given Tape Program, the user may decide to remove a Script Rule that has fired previously in the history of execution, i.e., there exists a Script Instance for this Script Rule. Or the user may edit a Script Rule or an actor in a way that would have inhibited or triggered its firing or the firing of other Script Rules in a different way if the history was replayed. This type of conflict can result in unreachability as above. Editing a rule that has already been used to build the history of execution can require rebuilding the history. The current state of the actor system may not be reachable using the modified set of rules. In this case, rewinding the execution of the Tape Program is recommended and re-execution of the old history to check if a comparable state of the actor system can be reached.

MOVON

Actor data-space and history: for practicality of implementation, the history maintained for an actor is based on a measure of data-space changes. Let:

| D(A, t)      | mDS(A, t)      |
| ------------ | -------------- |
| dD(A, t1, t2) | dmDS(A, t1, t2) | respectively, denote the data-space (D) of actor A at time t, a measure (the value of mDS is a number) of this data-space at time t, a difference (dD) in the data-space of A between the times t1 and t2, and a measure (dmDS, a number) of the data-space change for actor A between the times t1 and t2. The history of actor A may then be defined as a finite set of significant changes to the data-space of A. For example, knowing the initial data-space of an actor A:

$$D(A, t0)$$

a finite history of size n for actor A with granularity (e) can be defined as:

$$He(A) = \{(ti, dD(A, gi, ti-1)) | dmDS(A, gi, ti-1)) >= e\} 1 =< i =< n$$

and:

$$T(He(A)) = \{ti\} 1 = <i = <n$$

represent the set of time-stamps from the history of A.

The intermediate data-spaces of A are then obtained using: D(A, tj)=D(A, t0)+{+dD(A, ti, ti-1)}1= <i= <j,]

It is also possible to refine the model of actor history to using a space-efficient description of data-space changes for actor A:

$$He,g(A) = \{[(ti, dD(A, ti, ti - 1))|dmDS(A, ti, ti - 1) > = e] \text{ or }$$
$$[(ti, dD(A, th, ti))|dmDS(A, ti, ti - 1) > = e] \text{ and }$$
$$\text{there exist } h, 0 = < h < i, dmDS(A, th, ti) = < g]\}$$
$$1 = < i = < n$$

He,g(A) defines a model of actor history with granularity e and efficiency g. The intermediate data-spaces of A at time t can then be derived from the history of A using:

if t= <t0 then D(A, t)=D(A,t0)
if t>t0 then there exit (tj,t1) in T(He,g(A))
such that
tj= <tp, for all t', tj= <t'<tp, t' not in T(He,g(a))
then D(A,t)=D(A,tj)=D(A,ti)+{+dD(A,tik,tik-1)}0= <k= <K
satisfying:
1) (ti0, dD(A, tp, ti0)) is in He,g(A)
2) for all k, 0= <k= <K (tik, dD(A, tik, tik-1)) is in He,g(A)
3) tiK=tj An actor A is fully specified at time t by its data-space description D(A, t) which is a step-wise function of time knowing the actor initial data-space and its data-space history. An actor history only lists the times at which the actor was changed and the corresponding descriptions of changes to the actor data-space. Actor data-space changes of the form (dD) describe the addition of new slots and/or new values, and/or deletions of new slots and/or new values, and/or changes to values. The address of actor A, a(t) is a particular element of the data-space of A providing a unique identifier for A in the actor system.

Reversibility in an actor system: the actor history provides a history management mechanism local to each actor. In the system of communication between actors, an actor data-space can only be changed when the actor sends or processes a communication. Furthermore, sending and processing a communication are atomic operations. Therefore the scope of each change in the actor system is fully specified with each communication and the history of all actors can be maintained in linear time under the assumption that all actor data-space measures are fixed-value bounded. This model supports fully reversible computation in the limit of the size of actor histories maintained. An important advantage of this model of computation is the distribution of computation history between actors which supports reversible computations in distributed actor systems.

Actor environment: the GRAS implementation of actors uses a let environment to represent the data-space of actor A at time D(A,t):

(let a1=v1, . . . ,an=vn; . . . )

where ai is a symbolic representation of a slot of A, vi is the corresponding value or expression describing that value, and n is the total number of slots at time t, and the "=" sign represents an assignment of the value. The measure of the data-space of A at time t is: mDS(A, t)=n and the history definition used is: H1(A) (e=1). An actor environment fully describes the actor at time t. The behavior description of an actor is entirely derived from the actor environment and the behavior available from a tape where the actor plays.

Actor relationships and connections: actors are also involved in static and dynamic dependencies implemented as relations using frame representations with bidirectional links. Static dependencies include: class membershipe (AKO), component membership (COMPONENT or PART-OF), connections, tape membership, and others. Dynamic dependencies include connections between actors (e.g. a line connection for communication). It should be noted that new types of relationships between actors can be defined to fit the application domain. Visual representation preferences are available as attributes to represent and build new relations. A finite set of graphical primitives is used to provide (optional) visual representations for each type of relation (by combination of the graphics). New relations can be dynamically added to an actor as new attributes are learned and forgotten. Relational attributes are the set of actor's attributes used to define relations with other actors. An example is the COMPONENT relation, where a decomposition of the actor is provided in term of components and sub-components. Each component is an actor and can therefore communicate with other actors, but a component is also a physical part of the actor that owns it (e.g. a phone with a speaker and push-buttons).

VSM Functions

The GRAS system is implemented on a user level via the VSM module. The VSM module comprises user-level functions that call upon the lower level modules to perform user requests.

Special Effects: during or after recording, a special effects software module is available to refine a rule of behavior. For example, in a Script Rule, the actors, preconditions, postconditions, message and data transferred can be modified. The change requests are supplied by tracking-device input and menu selections. Additional special effects available to refine a General Script include interactive specification of characteristics (e.g. pattern matching expression on attribute values) to generate audit expressions defining the set of actor couples for the General Script.

Figure 6:
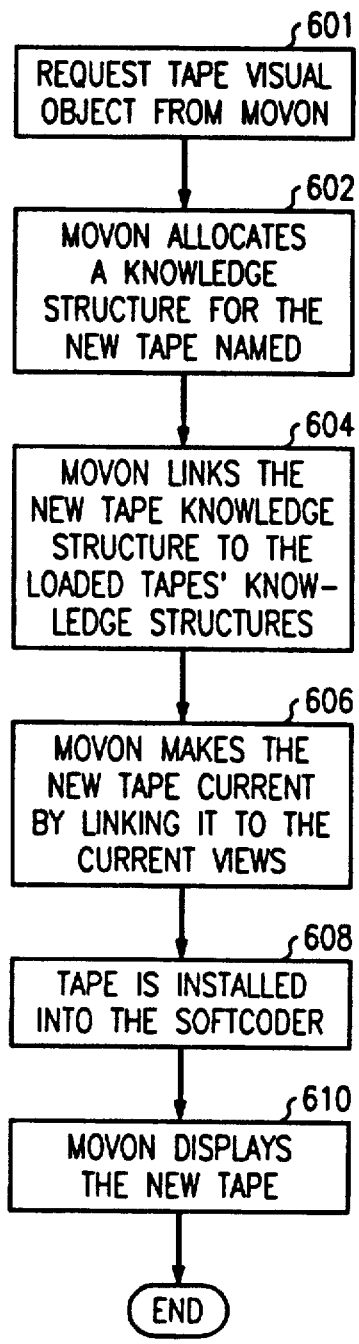
FIGS. 6-28 are flow diagrams illustrating various functions of the GRAS system.

FIG. 6 is a flowchart diagram of a CREATE TAPE function. The create tape function requests a tape visual object from MOVON (action block 601). MOVON then allocates a frame structure for the new tape named (action block 602). MOVON links the frame structure to the frame of loaded tapes (action block 604). The new tape is made current by linking its frame to the frames of video monitors (views) present in the environment (action block 606). The new tape is loaded (see Load Tape) into the SoftCoder (action block 608) and is linked to the future-reel and the past-reel, the simulation counter is internally set. MOVON displays the new tape (action block 610) causing the re-display of the video monitors.

Figure 7:
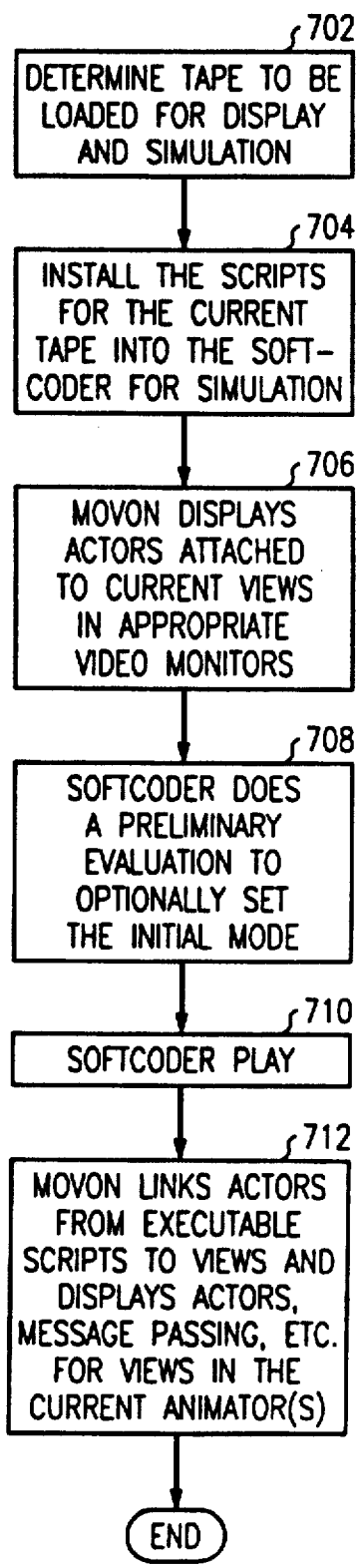

FIG. 7 is a flowchart diagram of a LOAD TAPE function. The load tape function determines a tape to be loaded (action block 702). The tape past-reel and future-reel are linked to the past-reel and future-reel elements of the SoftCoder resulting in the installation of a script instance and rules into the SoftCoder (action block 704). The simulation counter is set using the value of the tape counter. MOVON displays existing actors from the tape into the appropriate views in video monitors (action block 706). The SoftCoder does a preliminary evaluation to optionally set the initial simulation mode, speed of animation and level of detail (action block 708). The play function (described subsequently) is invoked (action block 710) and MOVON links actors from the first set of executable scripts to their associated views (according to the script tags) and displaying the actors, message and data exchanged in the appropriate views (action block 712).

Figure 8:
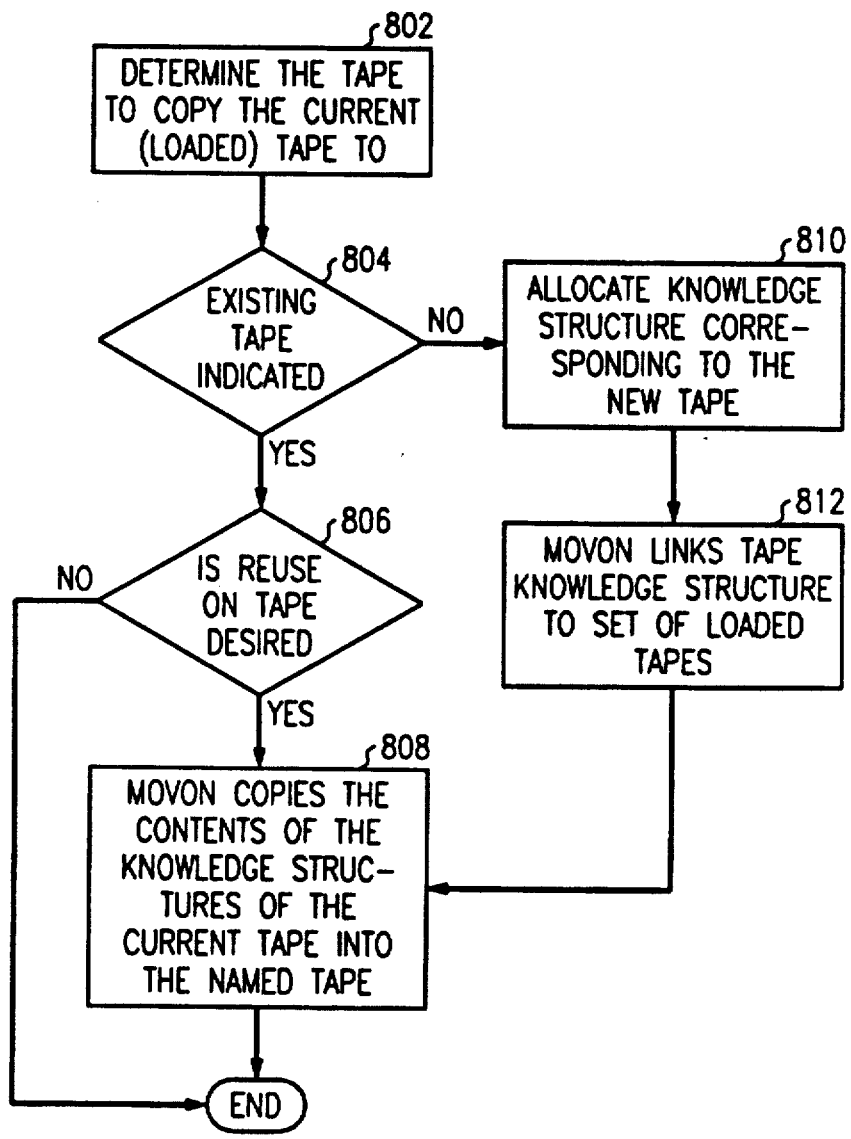

FIG. 8 is a flowchart diagram of a COPY TAPE function. The copy tape function first requests a source tape from which a copy is to be made (by default the current tape loaded), and the function then requests a destination tape to which to copy the source tape (action block 802). If the destination tape already exists (test 804) and if it is decided to reuse this tape (test 806) then the frame structure of the source tape is merged (with reuse) into the frame structure of the destination tape (action block 808). If the destination tape does not exist then a new frame structure is allocated (action block 810), the frame is linked to the frame of loaded tapes (action block 812), the source tape frame structure is merged into the new destination structure (action block 808).

Figure 9:
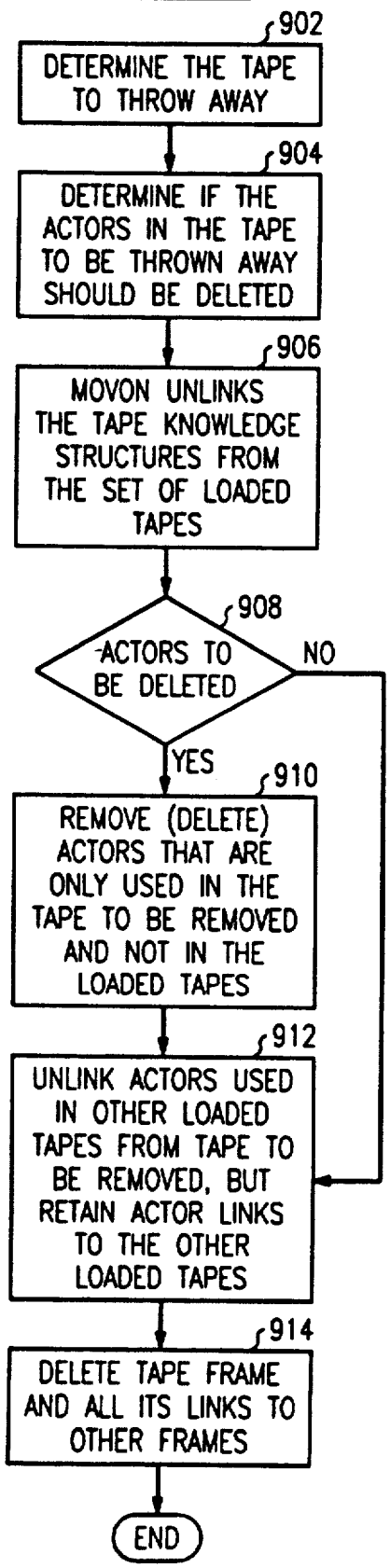

FIG. 9 is a flowchart diagram of a REMOTE TAPE function. The remove tape function determines a tape to be removed (action block 902) and determines if actors should be removed with the tape (action block 904). MOVON unlinks the frame structure of the tape from the frame of loaded tapes (action block 906). If actors should be removed with the tape (test 908) then the function removes (deletes) all actors that are used in the tape and that are not used in other loaded tapes (action block 910). Otherwise, if actors should not be removed with the tape the function unlinks actors used in the tape that are also used in other loaded tapes, but preserves links to other loaded tapes (action block 912). The function then deletes the tape frame structure (action block 914), erasing all its links to other frames.

Figure 10:
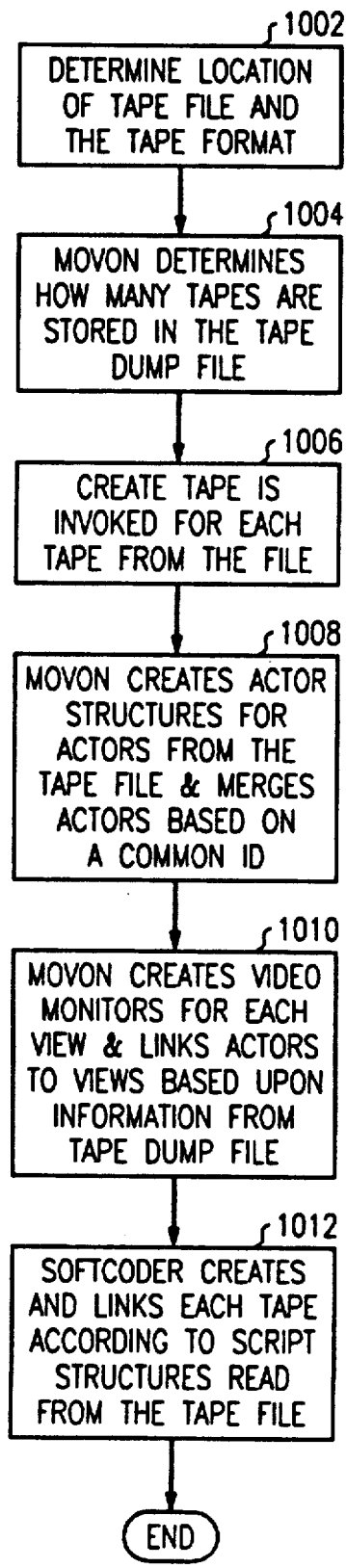

FIG. 10 is a flowchart diagram of a RENT TAPE FILE function. The rent tape file function requests a tape file format and a path to the tape file to rent (action block 1002). The number of tapes stored in the file is determined (action block 1004). The create tape function (FIG. 6) is invoked for each tape (action block 1006). MOVON creates or merges (with reuse) actors required for the tapes being created from file (action block 1008). MOVON creates video monitors for each view required by the tapes and links actors to views according to link information from the tape file (action block 1010). The SoftCoder then creates and links to each tape the corresponding script structures read from the tape file (action block 1012).

Figure 11:
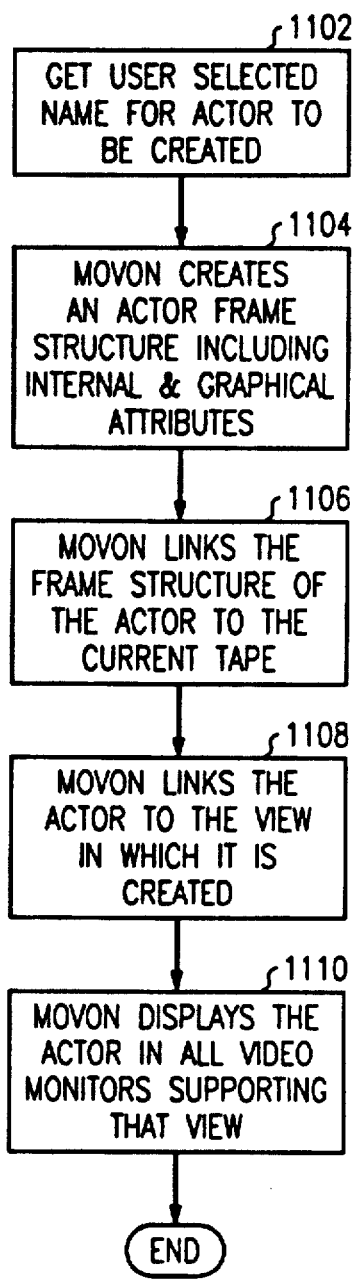

FIG. 11 is a flowchart diagram of a CREATE ACTOR function. The create actor function requests the identification of an actor to be created (action block 1102). MOVON allocates an actor frame structure and initializes it to include minimum internal and graphical attributes (action block 1104). MOVON then links the actor frame structure to the current tape (action block 1106) and the current views (action block 1108).

MOVON then displays the actor in all video monitors supporting the same view as the current view where the actor was created (action block 1110).

Figure 12:
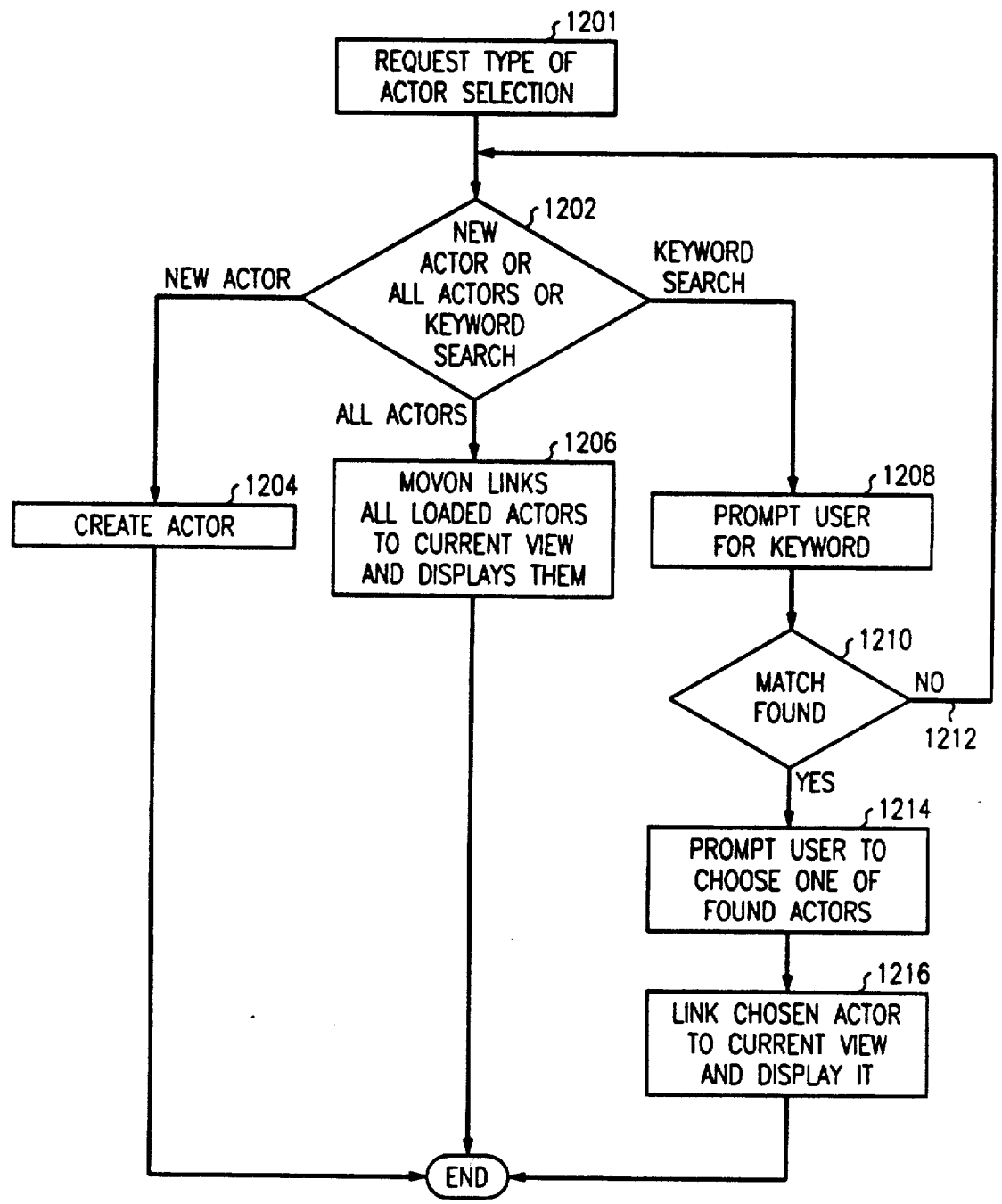

FIG. 12 is a flowchart diagram of a SELECT ACTOR function. The select actor function requests a type of actor selection (action block 1201). If a new object is selected (test 1202) then the create actor function is used (action block 1204). If all objects are selected (test 1202), then MOVON links all actors loaded (backstage actors) to the current view and displays them in the corresponding video monitors (action block 1206). If keyword search is used to select actors then the user is prompted to enter a keyword (action block 1208). If matching actors are not found (test 1210), a new selection is requested (action block 1202). If matching actors are found then a specific actor is requested (action block 1214) and the actor (if any) is linked to the current view and displayed (action block 1216).

Figure 13:
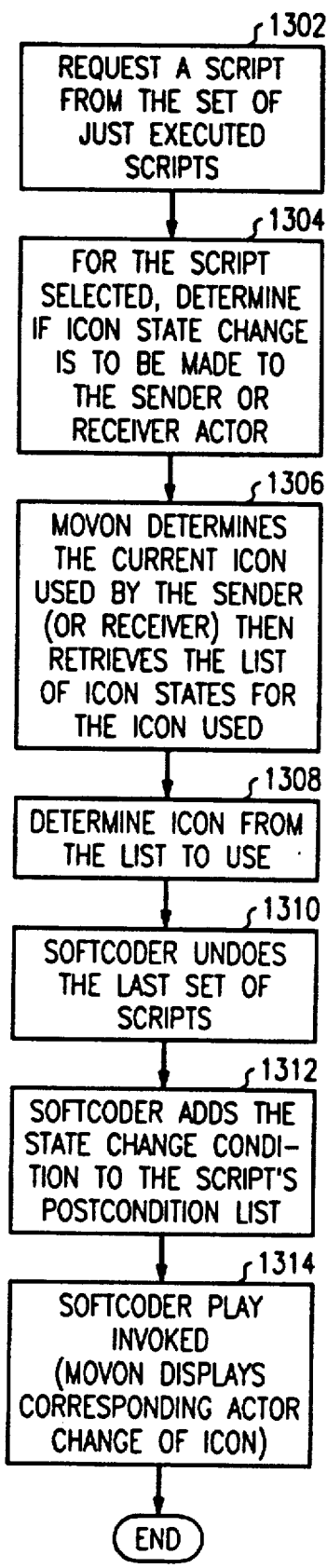

FIG. 13 is a flowchart diagram of a SET ICON STATE function. The set icon state function requests a script from the set of script instances just executed (action block 1302). Then it requests the sender or receiver actor from the script (action block 1304). MOVON determines the current icon used by the said actor and retrieves the set of possible icon states for this icon from the icon library (action block 1306). The set icon state function then requests an icon state from the set of possible icon states (action block 1308). The SoftCoder undo function is invoked on the script set (action block 1310). The SoftCoder adds a condition expression to change the state of the actor in the selected script post-condition list (action block 1312). The SoftCoder play function is invoked and MOVON displays the corresponding change to the actor as a result of executing the changed script definition (action block 1314).

Figure 14:
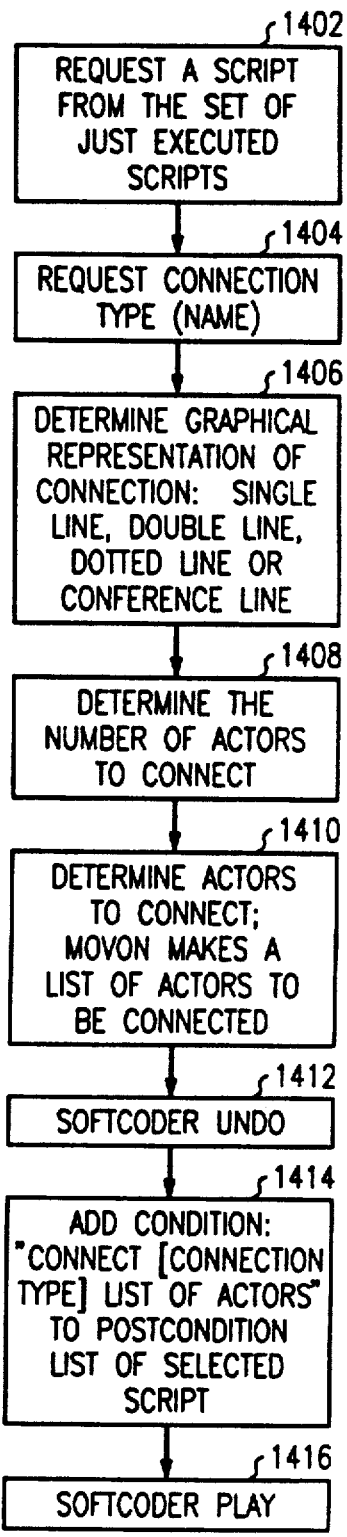

FIG. 14 is a flowchart diagram of a CONNECT ACTORS function. The connect actors function requests a script from the set of just executed scripts (action block 1402) and a type of connection (symbolic name) (action block 1404). The graphical representation corresponding to the type of connection is determined (e.g. single line, double line, conference line) (action block 1406). The number of actors to connect is requested (action block 1408). The actors to connect are requested (action block 1410). The SoftCoder undo function is invoked (action block 1412). A condition of the form: "CONNECT {connection-type} [list of actors selected]" is added to the postcondition list of the selected script (action block 1414). The SoftCoder play function is invoked (action block 1416) and as a result of executing the changed script, the connections between the actors selected is created and displayed in the appropriate views.

Figure 15:
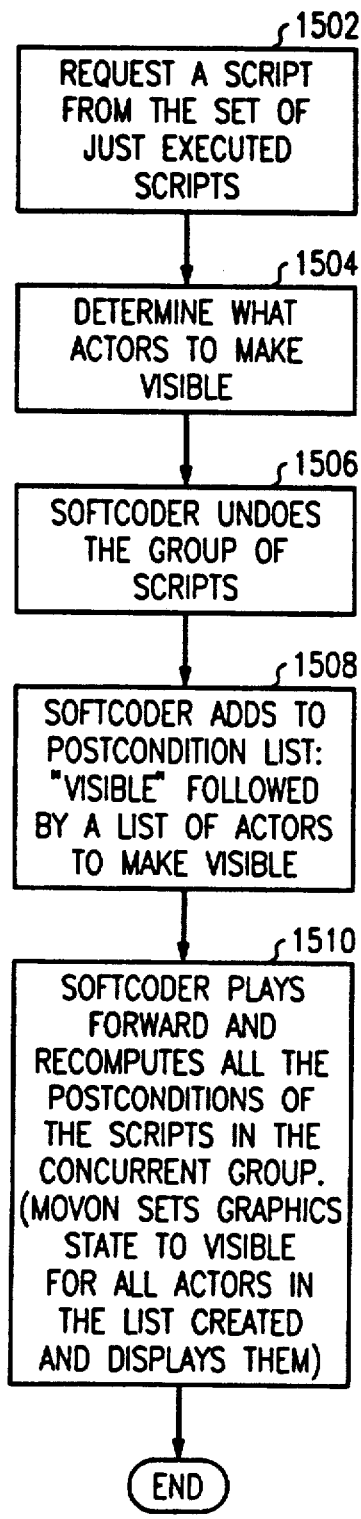

FIG. 15 is a flowchart diagram of a MAKE ACTORS VISIBLE function. The make actors visible function requests a script from the set of just executed scripts (action block 1502). The actors to create of make visible are requested (action block 1504). The SoftCoder undo function is invoked (action block 1506). A condition of the form: "VISIBLE [list of actors selected]" is added to the postcondition list of the selected script (action block 1508). The SoftCoder play function is invoked (action block 1510) and as a result of executing the changed script, the actors are made visible (or possibly created and made visible) and displayed in the appripriate views.

Figure 16:
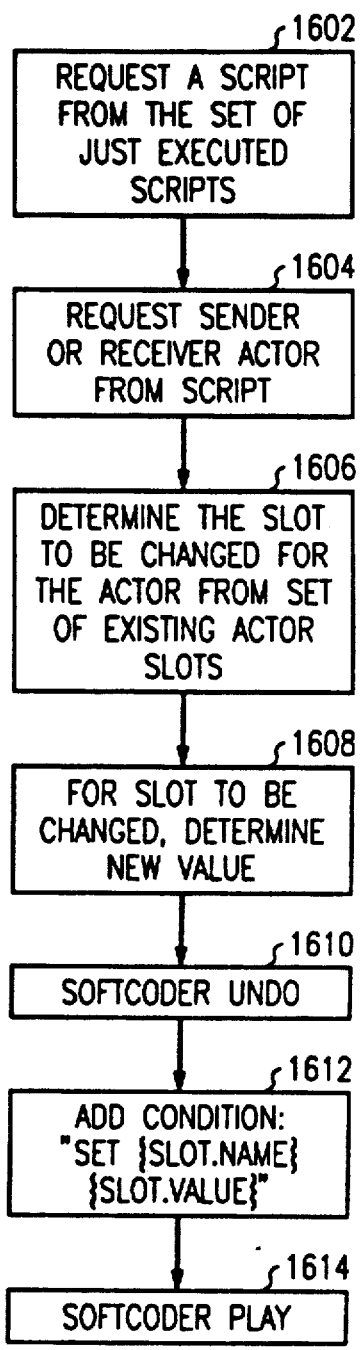

FIG. 16 is a flowchart diagram of a SET STATE OF ACTOR function. The set state of actor function requests a script from the set of script instances just executed (action block 1602). Then it requests the sender or receiver actor from the script (action block 1604). MOVON determines the current set of slots from the said actor the name of a slot is requested (action block 1606). This slot will be used to change the state of the actor. A new value is determined for the said slot (action block 1608). The SoftCoder undo function is invoked on the script set (action block 1610). The SoftCoder adds a condition expression to change the slot of the actor to the new value in the selected script postcondition list (action block 1612). The condition added is of the form: "SET {slot-name} {slot-value}". The SoftCoder play function is invoked and MOVON displays the corresponding change to the actor as a result of executing the changed script definition (action block 1616).

Figure 17:
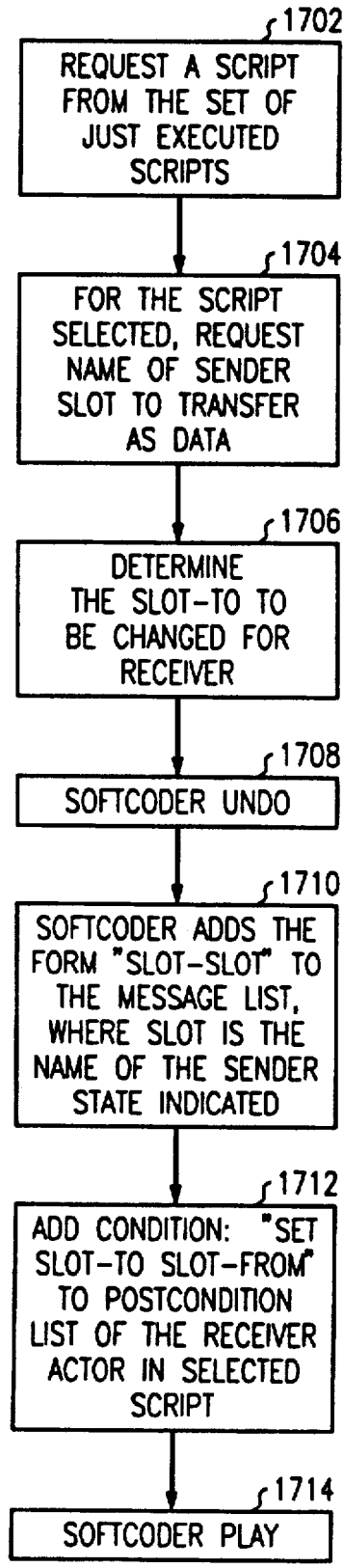

FIG. 17 is a flowchart diagram of a PASS DATA VIA MESSAGE function. The pass data via message function requests a script from the set of just executed scripts (action block 1702). The name of a slot from the sender actor of the said script is then requested (action block 1704). This slot [slot-from] is used as data to be sent to another actor. The name of a slot [slot-to] from the receiver actor is requested (action block 1706). The SoftCoder undo function is then invoked (action block 1708). A form "{slot-from} {slot-from-values}" is added to the message expression of the selected script indicating that the slot value of the sender actor is passed via the message and that it's symbolic name when received is {slot-from} (action block 1708). A condition of the form: "SET {slot-to} {slot-from}" is added to the postcondition list of the receiver actor for the selected script (action block 1710). The SoftCoder play function is invoked (action block 1712) and as a result of executing the changed script, the slot value from the sender actor is passed to update the [slot-to] value of the receiver actor and the corresponding graphics changes are displayed in the appropriate views.

Figure 18:
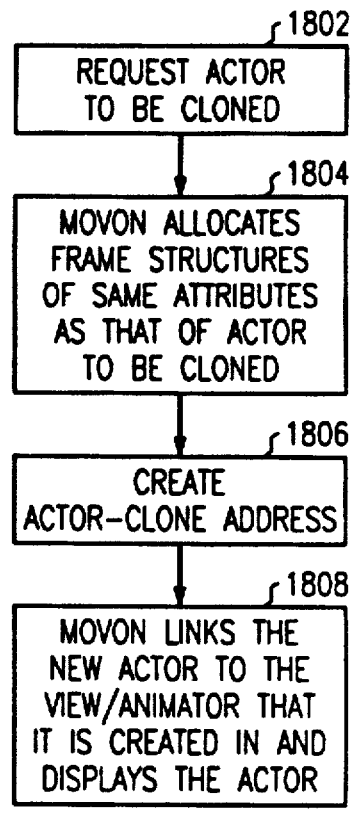

FIG. 18 is a flowchart diagram of a CLONE ACTOR function. The clone actor function requests an actor to be copied (action block 1802). MOVON allocates a frame structure for the actor (action block 1804). MOVON creates an address for the actor copied using the name of the original actor and a copy number that makes the address unique (action block 1806). MOVON links the new actor to the current view and display the copied actor in all video monitors with the same view (action block 1808).

Figure 19:
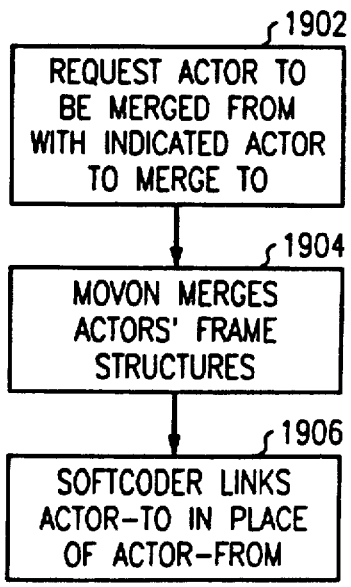

FIG. 19 is a flowchart diagram of a MERGE ACTOR function. The merge actor function requests one actor {act-from} to be merged into another actor {act-to} (action block 1902). MOVON merges the actor frame structures (action block 1904). The SoftCoder substitutes all references to the address of act-from by the address of act-to (action block 1906).

Figure 20:
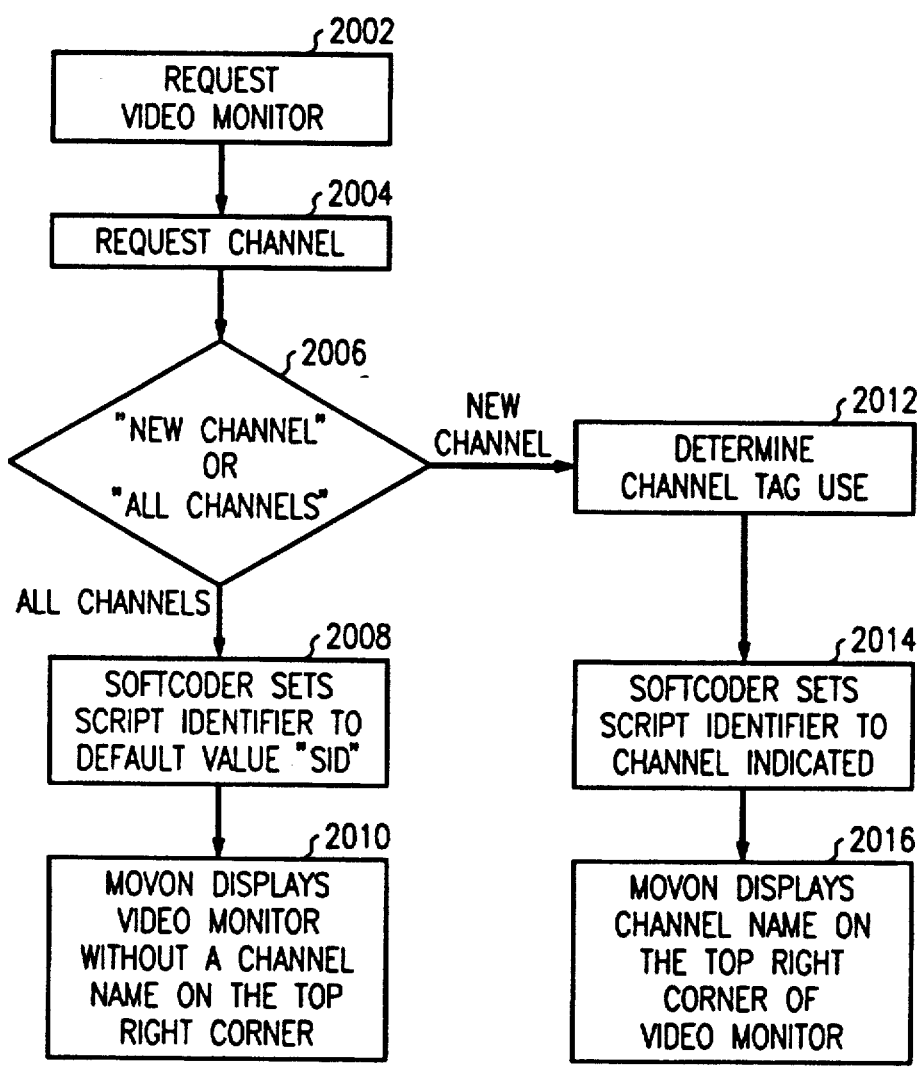

FIG. 20 is a flowchart diagram of a SET CHANNEL function. The set channel function requests a video monitor to change its channel (action block 2002) and requests a channel selection (action block 2004). If the channel selected is "all channels" (test 2006), then the SoftCoder sets the default Script Structure tag to be "Sid" in the video monitor (action block 2008) and MOVON displays the video monitor, leaving the channel designation empty (action block 2010). If the channel selected is a new channel, the corresponding Script Structure tag is determined (action block 2012). Then the SoftCoder sets the default tag to the requested tag in the video monitor (action block 2014). MOVON then displays the video monitor indicating the channel tag on its display (action block 2016). When recording in this video monitor, the tag serves of cross reference between the video monitor view and the set script structures created in this view.

Figure 21:
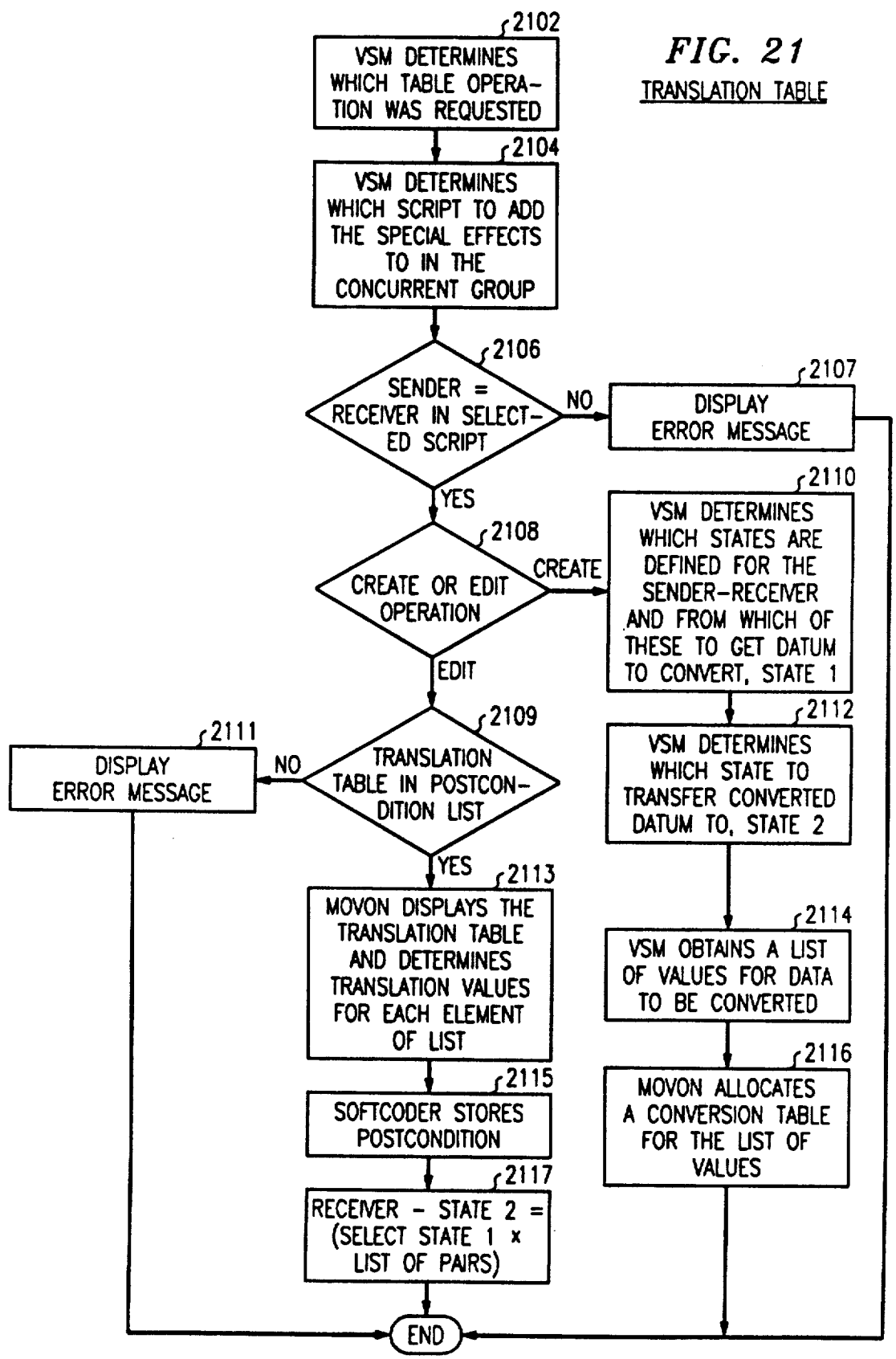

FIG. 21 is a flowchart diagram of a TRANSLATION TABLE function. A request for a table operation is sent to the user via the VSM (action box 2102). A request for a script from the current concurrent group of scripts is sent (action box 2104). If the sender actor is not identical to the receiver actor (test 2106) an error message is displayed (action box 2107) via the VSM and the function is ended. Otherwise, the script describes an internal processing task for an actor (sender=receiver), and a translation table can either be created or edited (test 2108). If (test 2108) no translation table expression exists in the script, the creation of a new translation table is necessary. Then a state (slot-1) of the actor is selected to be used as entry slot to the translation table (action box 2110) and a state (slot-2) of the actor is selected to store the result of the converted value by the translation table (action box 2112). A list of values for data conversion is requested (action box 2114). A translation table is allocated and a (new) conversion expression inserted into the selected script (action box 2116). If (test 2108) a translation table editing action is selected and if (test 2109) no translation table expression exists in the script then an error message is displayed (action box 2111) and the translation function is ended. If (test 2108) a translation table editing action is selected and if (test 2109) there exist a translation table expression in the script, then the translation table is displayed by MOVON via the VSM in an editable form and is edited by the user (action box 2113). Then the SoftCoder changes the postcondition list of the script to include the modified translation table expression (action box 2115). A translation table expression is of the form: "set slot-2 (select slot-1 {list of (entry, value-expression) pairs}", (action box 2117).

A video monitor is used to display or to record visually a set of transactions between actors into a tape. A video monitor may display or record a simplified view of the system being simulated or created. Video monitors have channel controls used to switch between views and controls for level of detail to provide a mechanism to zoom in and out of a particular part of a play. In the record mode, channel control changes correspond to a change of camera to get a different view point or perspective on the scene, level of detail variations correspond to zoom in and out control on the camera. The video monitors have a variety of characteristics that can be set and changed dynamically. For example, a user can set a video channel. Changing the channel in a monitor changes the view presented in it. The following characteristics: size, colors (where available), title, animation level and speed, memory size or how many events are "remembered" on the monitor at a time (persistence), a static versus dynamic display, resolution or level of detail displayed, and default message name position (which changes the default position of the message display relative to the sender and receiver actors) can all be selected by the user via menu or icons from the Video Monitor.

A video monitor can be used to: play, animate, or display a tape, record or set the stage for a transaction. The VSM interface provides direct control over tape creation, editing, viewing and execution. Changes can be incorporated during the execution by recording new specification input. While recording or playing, the level of detail in the tape can be varied (e.g. using a slide bar), providing a zooming effect between high level and detailed views. A video monitor serves as a drawing/editing board to change events and the special effects being animated in "play" mode. A video monitor can display hundreds of objects at the same time. Usually, fewer than 20 or 30 visual objects is a rule for good visual schematics based on standard graphics display technology. If more than 30 objects are needed in a tape, special effects can be used. With special effects, individual visual objects can become visible or invisible as desired.

A video Monitor in GRAS is implemented using windows to support multiple viewpoints. Because some design specifications are large, projections (multiple views) are supported to hide unnecessary information (or complexity) from the user. The GRAS system supports simultaneous recording and animation in multiple views. Each video monitor has a Video Channel and a Level of Abstraction used for recording and animation. To support windows and graphics and implement video monitors, as well as visual objects, a specific window and graphics system is used depending on the target computer system (e.g. SunView ™, X Window System ™, OPEN LOOK ™, Symbolics Windows, Xerox Windows). SunView is a trademark of Sun Microsystems. X Window System is a trademark of MIT. OPEN LOOK is a trademark of AT&T.

One application of the multiple viewpoints feature provides zooming between an abstract and a detailed view. For example, a customer of a proposed feature would see the high-level, abstract view. A feature developer would use the detailed view showing internal switch structure. Two views may be used to separate "hardware" and "software" behavior.

Use of windows is enhanced by using the GRAS windows and others. For example, a Sun workstation under SunView can have up to 64 windows. GRAS on Sun can use a dozen Video Monitor windows, while the remaining windows may be used by other Sun View applications (mail, text editing, and others) running at the same time as the VSM/GRAS application.

A Lisp machine may have several hundred windows (the number is only limited by disk space). VSM/GRAS on Lisp machines can have as many Video Monitors as desired (e.g. multiple views). This concept is similar to having several TV monitors tuned to different channels to provide different views of the execution of the same or different scenarios.

An Editing Room provides direct access to Tapes of the Tape Shelf and a set of operators used to edit and manipulate Tapes using a video-tape or film editing analogy. Tape editing provides a unique support for program manipulation. Based on execution context closure provided by the implementation of an actor and its environment, and its use in the processing of communications between actors, each Script Structure can be treated as an independent atomic computation performed by the SoftCoder virtual machine and can be manipulated as a basic program element. In a Tape Program, a closed set of Script Structure is always present. By gluing two tapes one possibly obtains the addition of functionality from both tapes, this makes feature integration a semi-automatable procedure in the context of GRAS. Cutting a tape into two sub-tapes is also provided but requires more caution since the tape must be cut at a position where both sub-tapes are left closed and consistent. Cutting and gluing of tapes provides a simple mechanism to combine functionality from different work efforts. Combined with the capability to merge actors, this provides a powerful framework to address successive integrations of new features in a program system.

SoftCoder

The Softcoder module of GRAS comprises a Future-Reel, comprising the set of Script Rules and General Scripts of a Tape Program, and a Past-Reel comprising a set of Undoable Scripts tracing the execution history of a Tape Program. In a Past-Reel, all Script Instances are reverse executable, i.e., the Sundo and Rundo expressions are present in all Script Instances. The Past-Reel contains the history of execution and data input during this execution, it may therefore be used as a test scenario.

Figure 29:
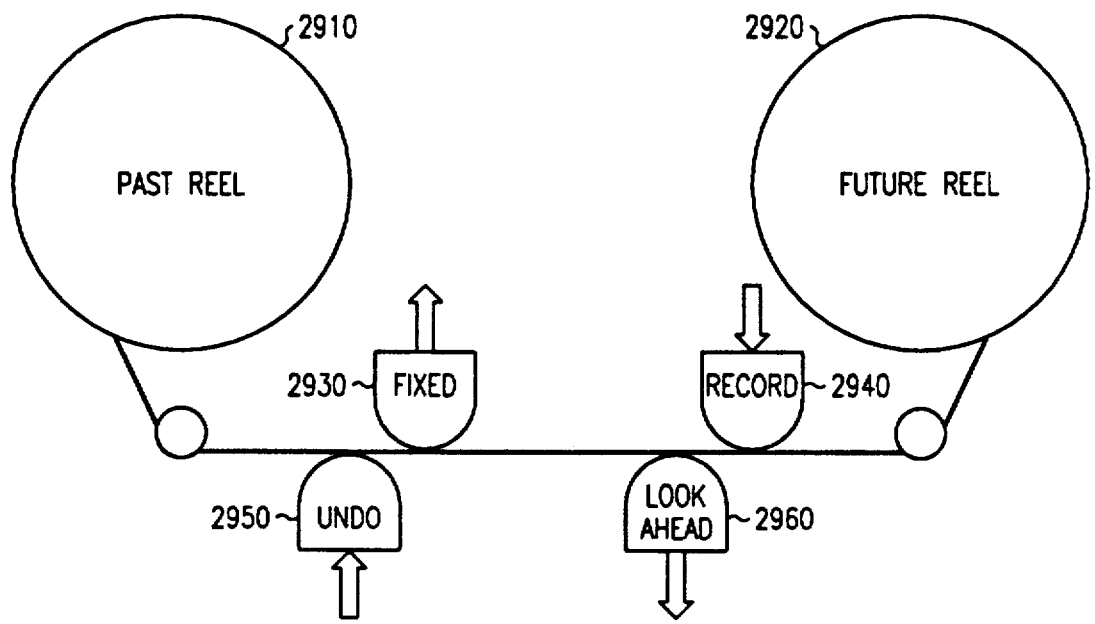
FIGS. 29-32 are diagrams illustrating GRAS system simulation modes in terms of the Video Studio Metaphor (VSM).

FIG. 29 gives a visual representation of the SoftCoder. A Tape is a set of recorded Script Rules and General Scripts, the past-reel 2910 corresponds to Script Instances that have been selected and fired by the simulator before the current simulated time, the future-reel 2920 contains remaining rules or the complete Tape Program in Production mode of simulation. Each reel turns clockwise and is advanced one or more steps at a time during simulation. The Fixed (Play) head 2930 reads and executes the current set of Script Rules and General Rules. The Undo head 2950 marks the Script Instances with undoing information. The Record head 2940 is available at all times to record and insert new rules. The Look-Ahead head 2960 is used in simulation to look for the next set of rules to fire.

Figure 22:
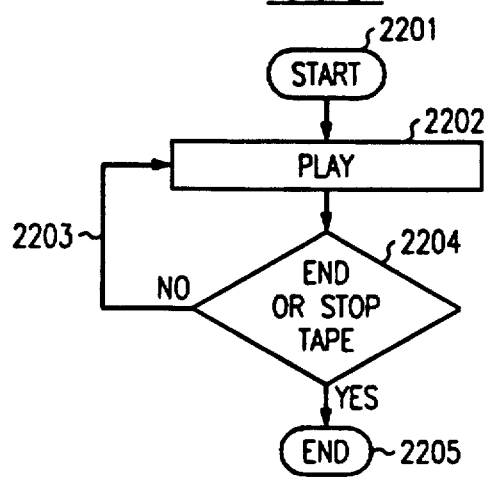

The SoftCoder comprises a "control panel" with the following controls:

Autoplay: plays the tape program from its current position to the end (or until a stop) automatically at the selected animation speed. FIG. 22 is a flow diagram of the autoplay control function. The autoplay function repeatedly invokes the play function (action block 2202) until the end of the tape program is reached or the stop function has been invoked since autoplay started (test 2204).

Figure 23:
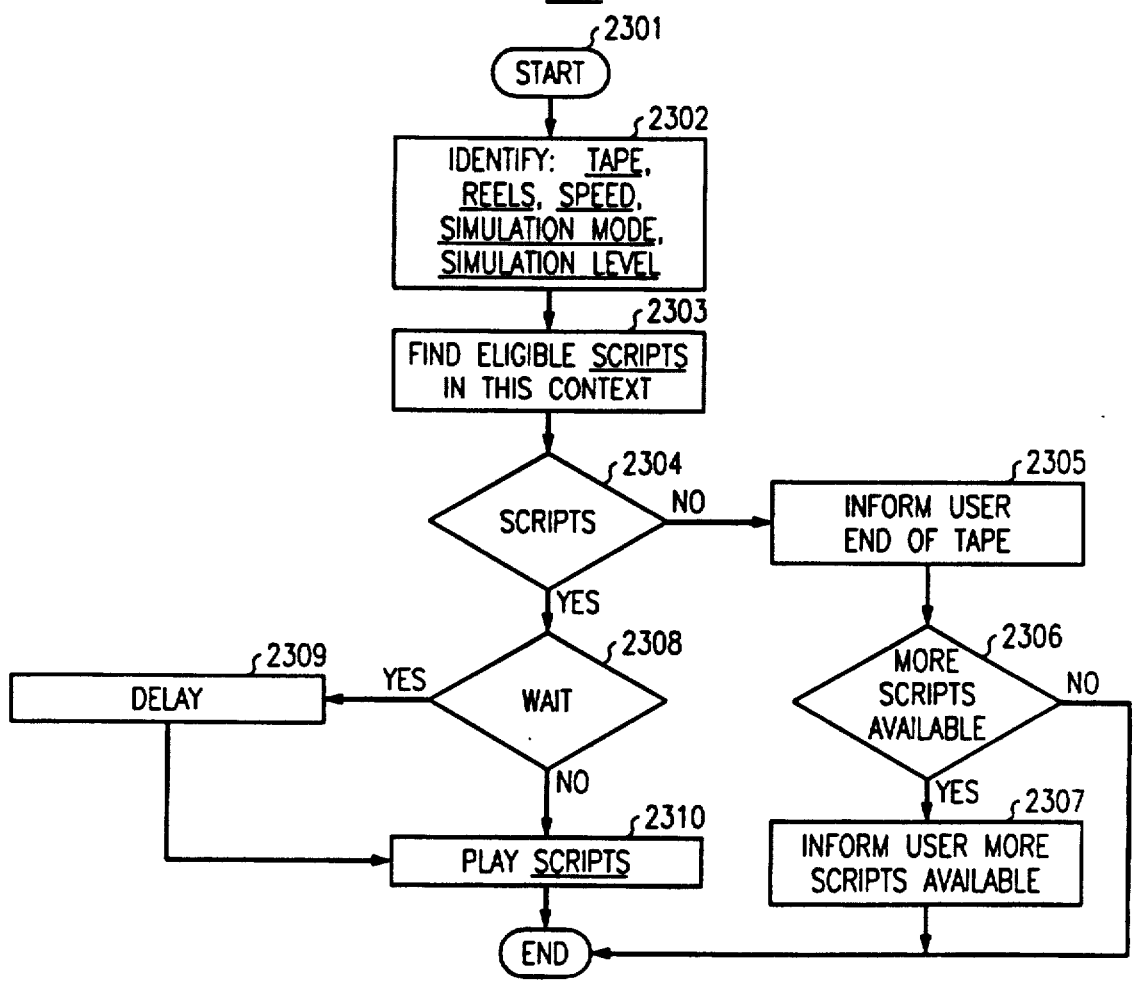

Play: plays the tape one step (frame) at a time by executing the set of rules of behavior currently fireable. FIG. 23 is flow diagram of the play control function. The play function identifies the following variables defining the play context (action block 2302): current tape loaded and its reels (future-reel and past-reel), current speed of animation, simulation mode, animation and simulation levels. In the play context the function then finds the eligible set of Script Rules and General Scripts from the future-reel (action block 2303) (see the following detailed description of this operation as a function of the simulation mode). If the set of scripts is empty (test 2304) the user is informed that the end of the tape program is reached (action block 2305) and the play function is ended. If more scripts are available (test 2306), the user is informed that other variants of the tape program execution are possible (action block 2307) and the play function is ended. If the eligible set of scripts is not empty (test 2304) then the scripts are played (action block 2310) (see following detailed description) and if the animation speed requires the simulator to wait (test 2308), a time delay is introduced (action block 2309) before playing the scripts and then ending the play function.

Figure 24:
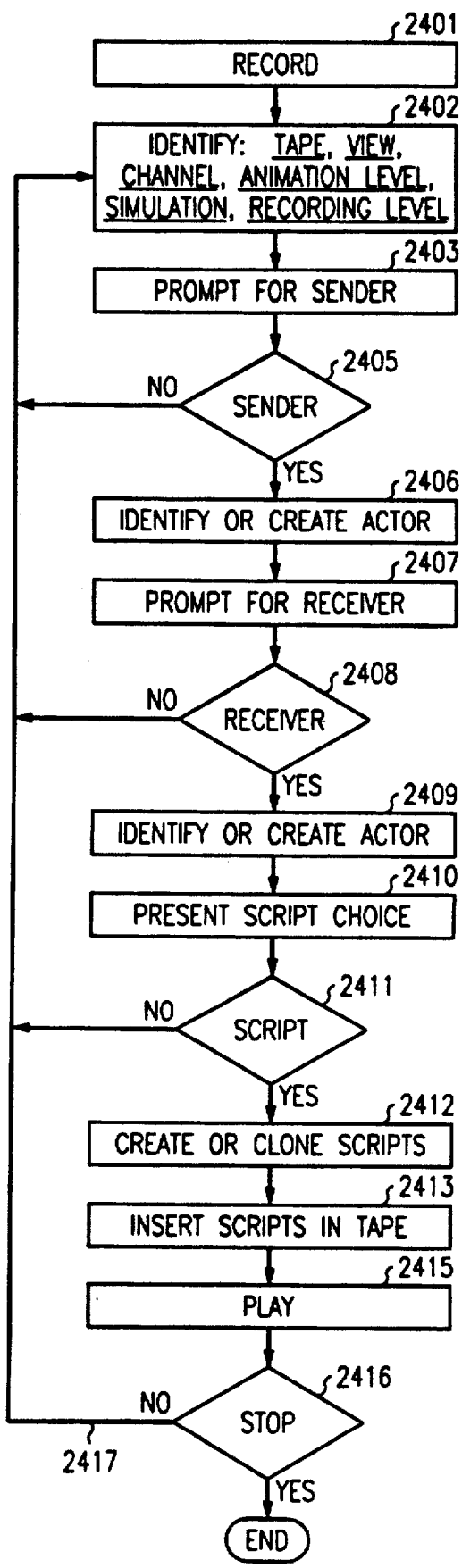

Record: records new communications and inserts them automatically at the current tape location. FIG. 24 is a flow diagram of the record function. The record function first identifies the following variables to defined the record context action (block 2402): current tape program, current views and channels, current animation, simulation and recording levels. The record function then requests a sender actor for the new communication being recorded (action block 2403). If a sender is specified (test 2405) then it is identified (via an audit process) or created (action block 2406), else the record function is ended. Knowing the sender actor, the record function then requests a receiver actor (action block 2407). If a receiver actor is specified (test 2408), it is identified or created (action block 2409), else the record function is ended. Then the record function requests a Script Rule to be chosen (action block 2410). If no script is specified (test 2411) the record function is ended, else a Script Rule or a General Script is created, if it does not exist, or cloned from an existing one (action block 2412). The new script is inserted into the tape program future-reel (action block 2413) and the play function is invoked (action block 2415). If the stop function has been invoked since the last record function (test 2416), the record function is stopped, else the record function restarts (action block 2401).

Figure 25:
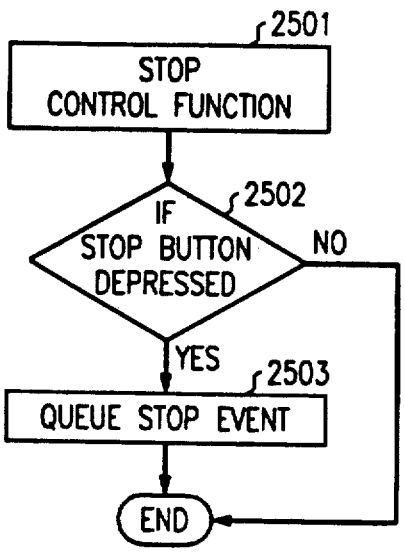

Stop: terminates the current automatic execution, recording or undoing of a tape. FIG. 25 is the flow diagram of the stop control function. The stop function is interrupt driven: if the stop button is depressed (test 2502) then a stop event is queued (action block 2503). As described, the play (autoplay), record and undo (autoundo) functions also check for stop events.

Figure 26:
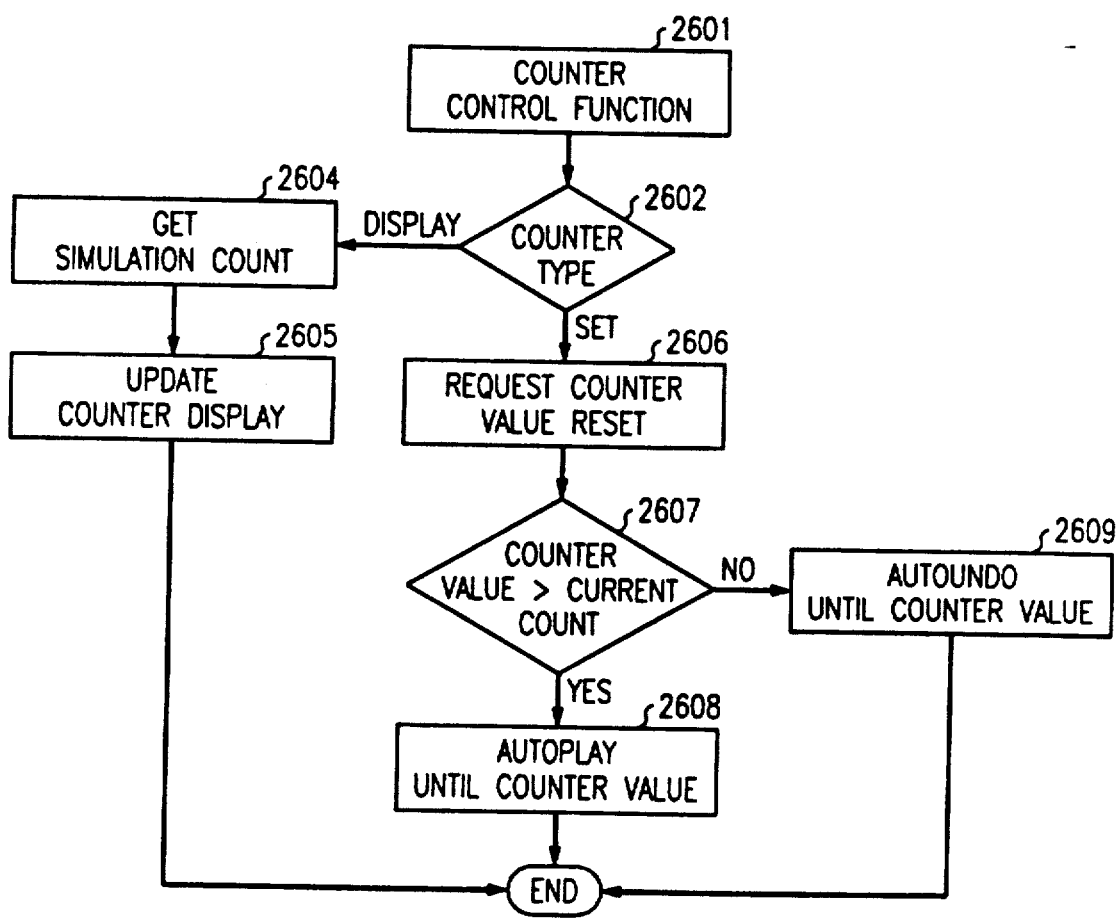

Counter: indicates the number of steps executed since the beginning of the tape. The counter is both an input and an output device. Setting the counter value to a particular position automatically advances or rewinds the tape to that position. FIG. 26 is a flow diagram of the counter control function. The counter function can be invoked two ways (test 2602): 1) for display or for setting. For display, the counter function gets the current simulation count, which is the number of simulation time units elapse since the beginning of the current tape program (action block 2604) and updates the counter display (action block 2605). For setting the counter, the counter function requests a counter value (action block 2606). If the counter value is greater than the current simulation count (test 2607) then the autoplay function is invoked until the desired counter value is reached, the stop function is invoked, or the end of the tape is reached (action block 2608). Otherwise, the autoundo function is invoked until the desired counter value is reached (action block 2609).

Figure 27:
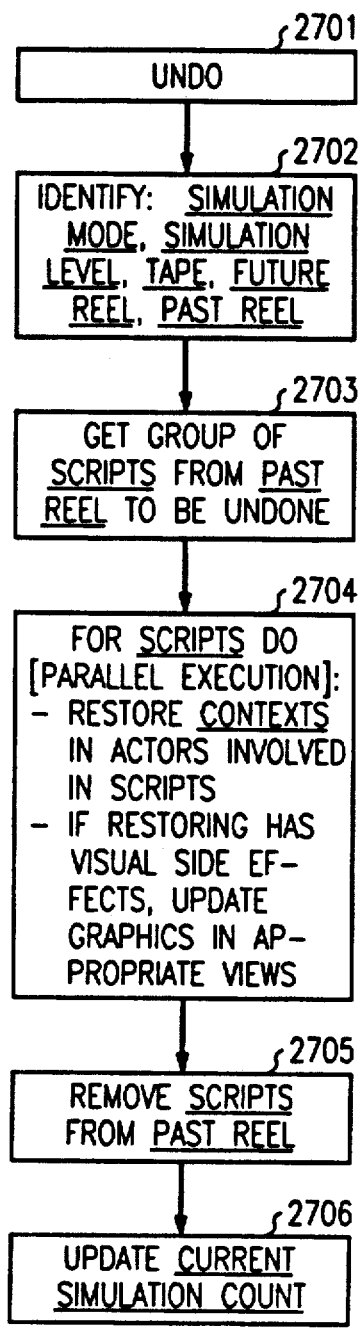

Undo: cancels the effects of the last set of communications (last set of script instances fired). Rewinds the last step and reverses the effect of the last group of computations. FIG. 27 is a flow diagram of the undo control function. The undo function identifies the undo context from the following variables (action block 2702): simulation mode, simulation level, current tape program (future-reel and past-reel), multiple views and animation levels. The undo function then gets the set of script instances to be undone from the past-reel (action block 2703). For the set of script instances to be undone, the undo function then: 1) restores the data-spaces of all actors involved in the set of scripts to the their data-space at a simulation time prior to execution time of this set of scripts, and 2) if the script instances had visual side-effects, execute the corresponding graphics undo functions (action block 2704). The undo function then removes the script instances from the past-reel (action block 2705) and updates the current simulation count and the current set of scripts (action block 2706). Further explanation on the undo function appears in the detailed description of simulation modes following.

Figure 28:
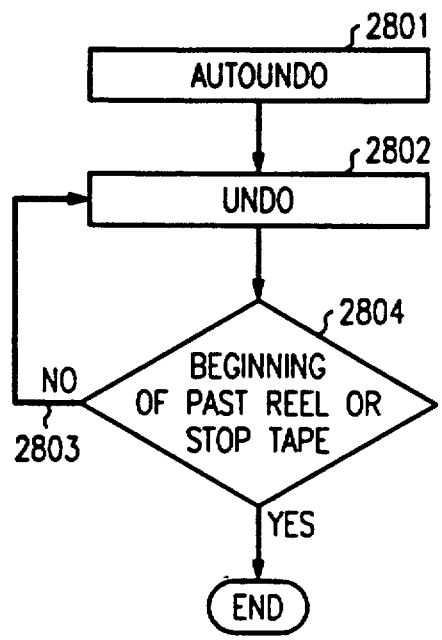

AutoUndo: provides automatic rewinding to the beginning of the tape or until you "stop" the tape with the Stop button. AutoUndo also fully reverses the effect of Autoplay at the selected animation speed. FIG. 28 is a flow diagram of the autoundo control function. The autoundo function repeatedly invokes the undo function (action block 2802) until the past-reel is exhausted or the stop function is invoked (test 2804).

Undo and AutoUndo are complete undo mechanisms. The effects of playing (and its visual side effects) are completely undone while using either control. This provides a simple and effective approach to debugging and testing. A scenario can be stopped in the middle, rewound to a specific point, altered and continued forward in a few mouse clicks. Dynamic animation of object state changes and transactions provide continuous visual feedback while debugging, testing, or simply viewing a feature in action.

A specification error will trigger a printed warning message that warns the user that the following part of the simulation may be erroneous or become inconsistent. The user is free to ignore this (temporary) incompleteness and continue with other elements of the design. Simulation errors are caused either by erroneous data or by incorrect rules and rule combinations: the user can use undo and play to browse through the specification and locate erroneous data or rules, then edit them on the spot and continue the simulation using play.

The use of the SoftCoder virtual machine within the VSM permits a user to specify a program from examples of its behavior. A graphical simulation in the VSM is not a simple sequence of graphical frames but a "programmable movie," i.e., depending on user input data the conclusion of the movie may turn out differently.

The sequential execution of each step of a specific scenario replays the example as it was input, but as modified by previously supplied actor input or other example scenario input pertaining to the specific scenario. The behavior described by the example may be interactively refined into a program through the addition of further actor data and/or additional example scenarios. The behavior of the actor system changes as actor states change and new data is exchanged between actors. The actors and Rules of Behavior can be edited at any time to change, delete or add other information about the state of the actor, the computation performed and the information exchanged during a communication. At the user's discretion, actor state and graphical representation changes may be either permanent or local (reversible). The resulting rules form the Tape Program.

SoftCoder Simulation Modes

A Tape Program is a collection of Script Rules and General Scripts, but it is also a collection of behaviors with (partial) precedence ordering. Total ordering of a tape is only found at run time by simulation of the Tape Program which results in the creation of a Tape Scenario. The SoftCoder has four simulation modes. These are (1) sequential, (2) smart, (3) concurrent, and (4) production modes.

The four simulation modes correspond to four different ways to play the same tape, that is, to execute a given specification. These four modes correspond to progressive refinement steps, starting with a simple sequential scenario and ending with an executable rulebase that can simulate a given feature in various situations (different data, different threads of execution, error handling, concurrency).

Figure 30:
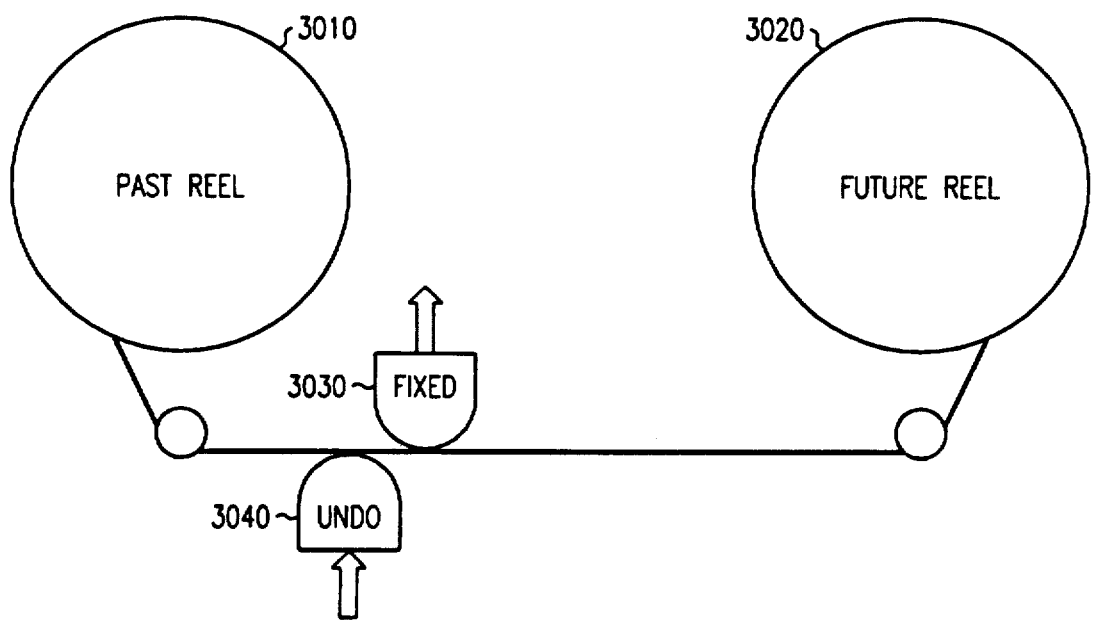

A visual representation of the sequential simulation mode is shown in FIG. 30. The sequential simulation mode plays each Script Rule and General Script in the order the tape was originally recorded. The fixed-head 3030 is always positioned on the last script fired.

Figure 31:
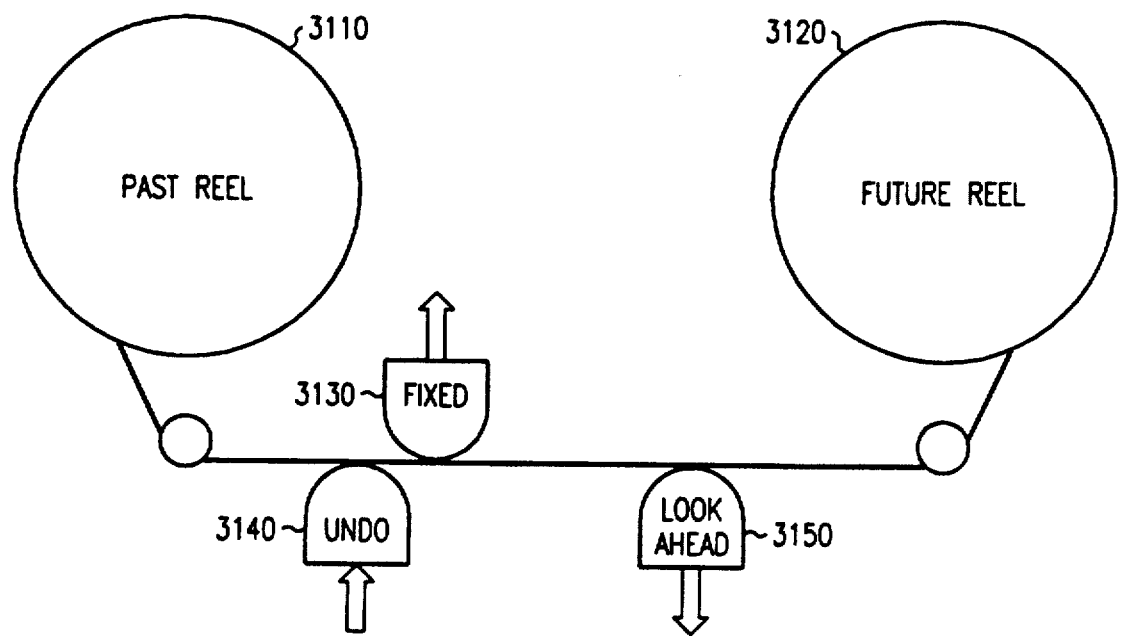

A visual representation of the smart simulation mode is shown in FIG. 31. In the smart simulation mode each Script Rule is tested before execution to see if it should logically be executed (fired) from the current tape stage. The first Script Rule that can be fired is fired, and is moved from the future-reel 3120 to the past-reel 3110 of the tape; intermediate Script Rules are skipped.

Figure 32:
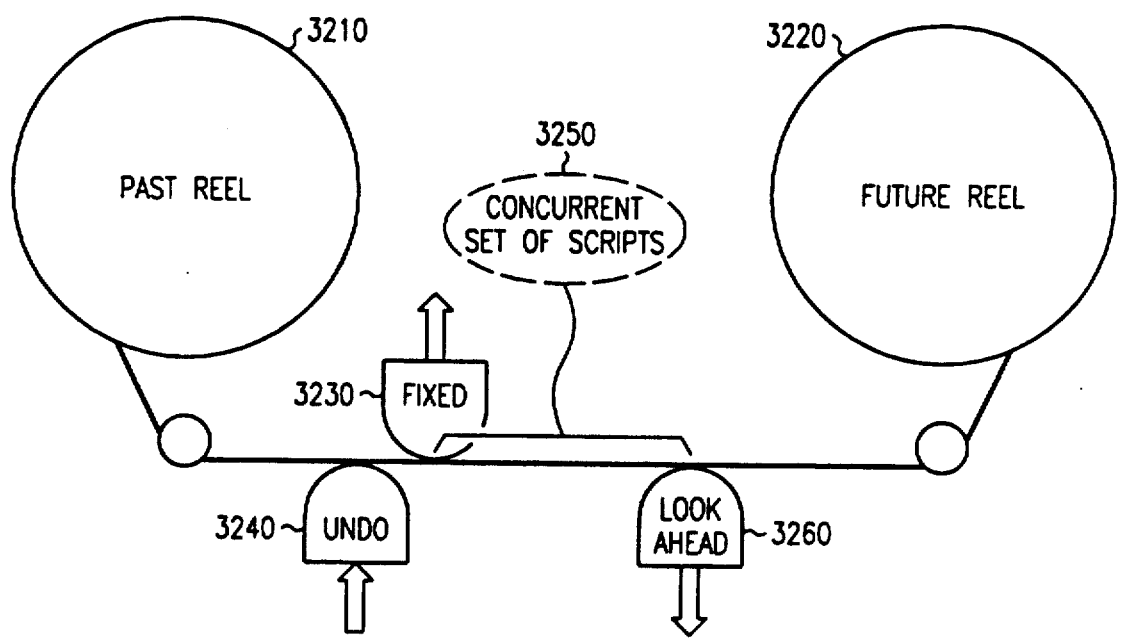

A representation of concurrent simulation mode is shown in FIG. 32. The concurrent simulation mode is an extension of the smart simulation mode. In this mode, each Script Rule is tested before execution to see if it can be logically fired from the current tape state. Often there is a group of Script Rules that can be fired simultaneously. The concurrent simulation mode allows the Script Rules to be fired at the same time using parallel execution.

The production simulation mode is an extension of the concurrent simulation mode, where the tape is glued into a closed loop and sequences of Script Rules and General Scripts can fire repeatedly. This mode is similar to a classic production rule system with parallel firing. In addition, this production mode supports time dependencies and fully reversible execution. A loop formed by a set of Script Rules repeatedly firing will continue to execute until a termination condition is met (e.g. a counter reaches a predetermined value).

Let: PR and FR denote the Past and Future reels of the current tape program loaded in the SoftCoder. Let: f,r,u, and 1a be the fixed, record, undo and look-ahead head of the SoftCoder, respectively.

At time t:
$PR(t) = (U1, U2, \ldots, Unt)$
$FR(t) = (R1, R2, \ldots, Rpt)$

The sequential simulation mode plays each Script Rule and General Script in the order the tape was originally recorded. The fixed-head is always positioned on the last script fired.

The sequential mode is implemented as follows:

1). PR(t) and FR(t) represent the current contents of two stack objects.

2). To play the next Script Rule: at time t, f(t) is first bound to rule R1 which is at the top of the FR stack, this rule is prepared for undoing by constructing and storing undo (restore) expressions for its actors and for its visual effects (a set of graphics undo commands), the rule is marked of type Undoable and becomes u(t). The message of f(t)=R1 is then sent from the sender actor to the receiver actor, the postconditions from f(t) are executed (changing some attributes of its actors), the corresponding visual effects are displayed, the FR stack is popped once, and u(t) is pushed into the PR stack where it becomes U1 t is incremented by a time unit. If no fireable rule is found, play is stopped and the user in informed that the end of the tape program was reached.

3). When recording, r(t) points to the rule just recorded, r(t) is pushed on the FR stack and the next step is played at time t.

4). When undoing one step, u(t) points to the next rule to undo U1, the visual effects of this rule are undone, including the optional message display, the undo expressions of its actors are executed restoring them to their initial state-before this rule fired. The undo expressions are removed from u(t), the original type of the rule is restored and it becomes f(t), the PR stack is popped once and f(t) is pushed on the FR stack where it becomes R1, t is decremented by a time unit.

5). To autoplay, the play step is repeated until the FR stack is empty and no other rule is recorded.

6). To autoundo, the undo step is repeated until the PR stack is empty.

7). To stop, the current autoplay or autoundo sequence is interrupted after the last complete rule execution or undoing (e.g. when the uninterruptible parallel execution of the communication between actors is complete).

In the smart simulation mode each Script Rule is tested before execution to see if it should logically be executed (fired) from the current tape stage. The first Script Rule that can be fire is fired, and is moved from the future-reel to the past-reel of the tape, intermediate Script Rules are skipped.

The smart mode is implemented as follows:

1). PR(t) and FR(t) represent the current contents of two stack objects.

2). To play the next Script Rule: at time t, f(t) is bound to rule R1 which is at the top of the FR stack, the preconditions of this rule are checked; if they are not satisfied, the FR stack is popped and f(t) is pushed onto PR (this rule is not changed to type Undoable), if the preconditions are satisfied, this rule is prepared for undoing by constructing and storing undo (restore) expressions for its actors and for its visual effects (a set of graphics undo commands), the rule is marked of type Undoable and becomes u(t). The message of f(t)=R1 is then sent from the sender actor to the receiver actor, the postconditions from f(t) are executed (changing some attributes of its actors), the corresponding visual effects are displayed, the FR stack is popped once, and u(t) is pushed into the PR stack where it becomes U1, t is incremented by a time unit. If no fireable rule is found, play is stopped and the user is informed that the end of the tape program was reached.

3). When recording, r(t) points to the rule just recorded, r(t) is pushed on the FR stack and the next step is played at time t.

4). When undoing one step, u(t) points to the next rule to undo U1. If U1 is not of type Undoable, the stack PR is popped and u(t) is pushed onto FR. If U1 is of type Undoable, the visual effects of this rule are undone, including the optional message display, the undo expressions of its actors are executed, restoring them to their initial states-before this rule fired, the undo expressions are removed from u(t), the original type of the rule is restored and it becomes f(t), the PR stack is popped once and f(t) is pushed on the FR stack where it becomes R1, t is decremented by a time unit.

5). To autoplay, the play step is repeated until user input is required or the FR stack is empty and no other rule is recorded.

6). To autoundo, the undo step is repeated until the PR stack is empty.

7). To stop, the current autoplay or autoundo sequence is interrupted after the last complete rule execution or undoing (e.g. when the uninterruptible parallel execution of the communication between actors is complete).

The concurrent simulation mode is an extension of the smart simulation mode. In this mode, each Script Rule is tested before execution to see if it can be logically fired from the current tape state. Often there is a group of Script Rules that can be fired simultaneously. The concurrent simulation mode allows the Script Rules to be fired at the same time using parallel execution.

The concurrent mode is implemented as follows:

1). PR(t) represents the current contents of a stack object, and FR(t) is the contents of a stack-sequence object combination, that is FR is a stack so that it can be pushed and popped and is also a sequence so that it can be searched and modified by direct access without popping and pushing.

2). To play the next Script Rule: at time t, f(t) is bound to rule R1 which is at the top of the FR stack, the preconditions of this rule are checked, if they are not satisfied or if the rule is already marked of type Group, the FR stack is popped and f(t) is pushed onto PR (this rule is not changed to type Undoable); if the preconditions are satisfied (the rule is said to be fireable at time t), it is the first fireable rule, f(t) is marked of type Group and added to its own Group-Saddresses field; it remains as f(t), and la(t) is applied to FR(t). If no fireable rule is found, play is stopped and the user is informed that the end of the tape program was reached. The look-ahead procedure, la(t) does a fast search through FR(t) to gather all the other fireable rules at this time, each rule found is marked of type Group, the set of rules found by fa(t) is then joined with the current Group-Saddresses set of f(t) (which is initially {f(t)}). The f(t) rule of type Group is prepared for undoing by constructing and storing undo (restore) expressions for all its actors (actors from its Group-Saddresses set) and for its visual effects (sets of graphics undo commands), the rule set is marked of type Undoable Group and becomes u(t). The message set from the Group-Saddresses of f(t)=R1 is then sent in parallel from the sender actor set to the receiver actor set, the postconditions from the f(t) Group-Saddresses are executed in parallel in separate context for each rule in the set, changing some attributes of corresponding actors, the corresponding visual effects are displayed, the FR stack is popped once, and u(t) is pushed into the PR stack where it becomes U1, t is incremented by a time unit.

3). When recording, r(t) points to the rule just recorded, r(t) is pushed on the FR stack and the next step is played at time t.

4). When undoing one step, u(t) points to the next rule to undo U1. If U1 is not of type Undoable, the stack PR is popped and u(t) is pushed onto FR. If U1 is of type Undoable, in parallel for the rules of the Group-Saddresses of u(t), the visual effects of each rule are undone (including the optional message display), the undo expressions of its actors are executed restoring them to their initial state-before this rule fired, the undo expressions are removed from u(t), the original type of each rule is restored and the top rule becomes f(t), the PR stack is popped once and f(t) is pushed on the FR stack where it becomes R1, t is decremented by a time unit.

5). To autoplay, the play step is repeated until user input is required or the FR stack is empty and no other rule is recorded.

6). To autoundo, the undo step is repeated until the PR stack is empty.

7). To stop, the current autoplay or autoundo sequence is interrupted after the last complete rule execution or undoing (e.g. when the uninterruptible parallel execution of the communication between actors is complete).

The production simulation mode is an extension of the concurrent simulation mode, where the tape is glued into a closed loop and sequences of Script Rules and General Scripts can fire repeatedly. This mode is similar to a classical production rule system with parallel firing. In addition, this production mode supports time dependencies and fully reversible execution. A loop formed by a set of Script Rules repeatedly firing will continue to execute until a termination condition is met (e.g. a counter expires). The production mode is implemented as follows:

1). PR(t) represents the current contents of a stack object, and FR(t) is the contents of a sequence-hash_table-lattice object combination. FR is analogous to a sequence so that it can be searched through efficiently. FR is a hash table or a kind of key-encoded computer object, so that a Script Rule can be efficiently retrieved from its symbolic reference (Sid) no matter how many Script Rules are stored in FR. It is a lattice where Script Structures have been preordered based on precomputed logical dependencies between one another so that the next set of rules that can fire after a given subset of rules is know to be included within a limited subset of FR. In production mode, FR is not altered (e.g. via pop and push) during play, autoplay, undo or autoundo. However, FR is changed and reorganized during record and erase (delete) of Script Rules. Assuming no recording or erasing occurs during play or undo, let FR=(R1, R2, ..., Rp). At time t, let SFR(t)=S(FR, t)=(R1, R2, .., Rpt) with pt<=p, be a finite subset of Script Rules from FR that are candidates to fire at time t. SFR is derived from the FR lattice knowing the rules that fired prior to t.

2). To play the next Script Rule: f(t) is bound to rule R1 which is the first rule from SFR(t), the preconditions of this rule are checked, if they are not satisfied, the rule is ignored and f(t) is bound to an instance of the next rule from SFR(t), which is checked until either f(t) is a fireable rule or all rules from SFR(t) have been unsuccessfully checked. If no fireable rule is found at this time, f(t) is bound to an instance of a rule of type Wait and Undoable, f(t) is pushed onto PR, t is incremented by a time unit. If the preconditions of f(t) are satisfied, i.e., the rule is fireable at time t, it is the first fireable rule from SFR, f(t) is replaced by an instance of itself to prevent changing the original rule, is marked of type Group and added to its own Group-Saddresses field. It remains as f(t), and la(t) is applied to SFR(t). The look-ahead procedure, la(t) does a fast search through SFR(t) to gather all the other fireable rules at time t, each rule found is collected as an instance of itself marked of type Group, the set of rule instances collected by fa(t) is then joined with the current Group-Saddresses set of f(t) (which is initially {f(t)}). The f(t) rule of type Group is prepared for undoing by constructing and storing undo (restore) expressions for all its actors (actors from its Group-Saddresses set) and for its visual effects (sets of graphics undo commands), the rule set is marked of type Undoable Group and becomes u(t). The message set from the Group-Saddresses of f(t)=R1 is then sent in parallel from the sender actor set to the receiver actor set, the postconditions from the f(t) Group-Saddresses are executed in parallel in separate context for each rule in the set, changing some attibutes of corresponding actors. The corresponding visual effects are displayed, and u(t) is pushed onto the PR stack where it becomes U1, t is incremented by a time unit.

3). When recording, r(t) points to the rule just recorded, r(t) is inserted in the FR lattice as an element of SFR(t), the lattice is recomputed to restore preordering if needed, the next step is played at time t.

4). When undoing one step, u(t) points to the next rule to undo U1. If U1 is not of type Undoable, there is an error. If U1 is of type Undoable and Wait, U1 is discarded and t is decremented by a time unit. If U1 is of type Undoable and not Wait (Group), then in parallel for the rules of the Group-Saddresses of u(t), the visual effects of each rule are undone, including the optional message display, the undo expressions of its actors are executed, restoring them to their initial state-before this rule fired, the undo expressions are removed from u(t), the original type of each rule is restored and the top rule becomes f(t), the PR stack is popped once and f(t) remains as is, t is decremented by a time unit.

5). To autoplay, the play step is repeated until user input is required or the Stop button is depressed.

6). To autoundo, the undo step is repeated until the PR stack is empty.

7). To stop, the current autoplay or autoundo sequence is interrupted after the last complete rule execution or undoing (e.g. when the uninterruptible parallel execution of the communication between actors is complete).

3. Recording, Erasing, and Querying for Rules of Behavior Several advantages in the use of GRAS and in the power of execution of the SoftCoder are derived from the flexibility to make changes any time and automatically validating them in a reasonable time, limited to the computation power of the machine. The play and undo mechanism described above are examples of such a flexible computation model provided by the Soft-Coder. The ability to record new communications between actors in the middle of the simulation of a tape program or to remove irrelevant rules of behavior are other examples of the power of the SoftCoder approach to specification, system design and testing.

To record a rule of behavior between actors requires three steps:

1). Visual programming: a basic Script Structure is generated using necessary information collected via visual clues, type-in, and menu entries.

2). Rule insertion: the new Script Structure is inserted in the current rule base (FR or SFR).

3). The modified tape program is played one step further (as described in the previous section).

Visual Programming: A basic Script Structure, R0 is built from selecting a sender and a receiver actor from one of the video monitors currently active on the GRAS display, or via menu selection and keyword search, or by selecting audit expressions to retrieve actors from the backstage. The audit expressions may be edited and customized by the user. The R0 Script Structure is given a new symbolic reference (Sid), the Sender and Receiver attributes are filled-in with the actors (or actor audit descriptions) selected, the Preconditions of the sender and receiver default to T (true) and no postconditions are defined. A new message is then specified (typed-in by the user) or selected via menu and keyword search through a set of existing Script Structure. If a new message is specified, the Message field of R0 is filled-in with the message specified. If an existing Script Structure R1 is selected, instances of the preconditions, postconditions and message expressions of R1 are created and are used to fill-in the corresponding fields in R0. In either case, the preconditions of R0 are altered when necessary to insure that the newly recorded rule is likely to fire as a consequence of the previous set of rules fired. For example, if R0 is recorded after R2 fired a default precondition stating "R0 must fire after R1" is generated in the target rule description language.

Rule Insertion; At this point, rule R0 is ready for insertion in the future reel. In sequential, smart and concurrent modes, R0 is simply pushed onto the FR stack, two recording modes are then possible:

1). In connected mode, all rules in FR that used to depend on precedents of R0 of fire (that is R1 in the above example) are automatically updated to now depend on R0 for firing. So the preconditions of certain rules in FR are changed.

2). In parallel mode, no rule from FR is changed, R0 is therefore expected to fire in parallel with other rules that would have normally fired after its precedents (after R1 in the above example). In production mode, R0 is inserted as first element in SFR(t), changes in the lattice structure of FR are automatically computed, then depending on the recording mode:

1). In connected mode, all rules in SFR(t) that used to depend on precedents of R0 to fire (that is R1 in the above example) are automatically updated to now depend on R0 for firing. So the preconditions of certain rules in SFR(t) are changed and changes are propagated in the organization of the FR lattice.

2). In parallel mode, no rule from SFR(t) is changed, R0 is therefore expected to fire in parallel with other rules from SFR(t) that would have normally fired after its precedents (after R1 in the above example).

To erase existing rules of behavior, the basic operation provided by the SoftCoder permits the user to remove the last Script Rule that fired. If this last rule is of type Group, the user is prompted for selecting one rule from the set. The tape program is then undone by one step and the selected Script Structure is removed from FR (or SFR in the production mode). Then all rules that used to depend on the removed rule to fire are given a best fit replacement rule to depend upon for firing. In the production mode, the lattice structure of FR is then reorganized and a new preorder between rules may result. Then the tape program is played one step to display the effect of the change; another rule is likely to fire in place of the removed rule. To erase larger chunks of the rule set, the Film Editor provides a way to cut a portion of the rule set and discard it.

A query of the existing rule set for the future or past execution of a certain type of (or subset of rule) provides a mechanism to quickly position the execution of a tape program at a point of interest for the user. Using the SoftCoder advanced program execution features, it is possible to request automatic positioning of the tape program at a point of interest in the execution history of future. This can be done by recording a visual query that describes an example of a point of interest and searching for a matching sequence of executed rules in PR first and position the tape via autoundo the required counter location if such matching is successful, else by starting the execution in autoplay until a match is found.

Video Connectors

A Video Connector is a software communication protocol combined with a physical or virtual data-link between a foreign system and GRAS. A Video Connector is analogous to the coaxial cable linking a source of a video signal (camera, mixer, TV-cable) to a VCR. However, in VSM, a Video Connector provides a communication path for both recording events from an external system into a Tape, and remotely controlling GRAS from the external system.

GRAS can record specifications from user interactions from all Video Monitors, as a camera following the user sketching (specifying) transactions. Each Video Monitor during recording is part of a Video Studio where actions between actors are recorded by the camera. The camera in a Video Studio is linked to the SoftCoder by a virtual Video Connector.

The Video Connector interface is implemented in such a way that an application can send data-traces to GRAS and remotely control GRAS at the same time. For example, the application can create a new Tape, start remote recording of the Tape (i.e. queuing messages), change the level of detail, change the animation view, and GRAS will start animating the trace in synchronous or asynchronous mode. If desired, the application can fully control the graphical representations used. The remote control of GRAS is based on a standard Remote-Evaluation protocol (remote function call) that can be supported by any bidirectional datalink.

OOScripts

An OOScript is the atomic entity that defines a single transaction between two actors. An OOScript is the smallest entity describing one aspect of an actor's behavior. Each OOScript describes one rule of behavior involving one or two actors known as Sender and Receiver.

Formally, an Object-to-Object Script (OOScript) is defined as a mathematical tuple (sid, sender, receiver, precond-list, postcond-list, message, optional documentation). Each OOScript is associated with a unique identifier (sid); (sender) refers to the entity that invoked (message) to call (receiver); (precond-list) provides the preconditions that must be satisfied for the OOScript to be activated; (postcond-list) provides the postconditions of a system that are asserted true after the OOScript has completed execution; (message) is the name of the message or function invoked, with optional arguments; optional documentation can include comments on the transaction represented or the objects involved.

The syntax of OOScripts is the following: Both precond-list and postcond-list are enclosed by parentheses, while the optional documentation are enclosed in double quotes. A message without arguments may appear with or without parentheses enclosing it, while messages with arguments appear as a parenthesized list with the message name as its first element followed by the arguments. A literal data message that is passed is denoted as a literal string enclosed in double quotes.

An OOScript embodies a rule covering the interaction between the sender and the receiver during a transaction where the sender sends a message to the receiver. A message may consist of a function invocation, (i.e. requests for action as in procedure call), data transmission, or both. The rule specifies which entity or entities are the sender and receiver, the specification of the conditions governing when such an interaction occurs and the conditions that are the results of the interaction. A script is a set of OOScripts covering the rules of behavior of a system for a particular situation or event sequence.

Figure 2:
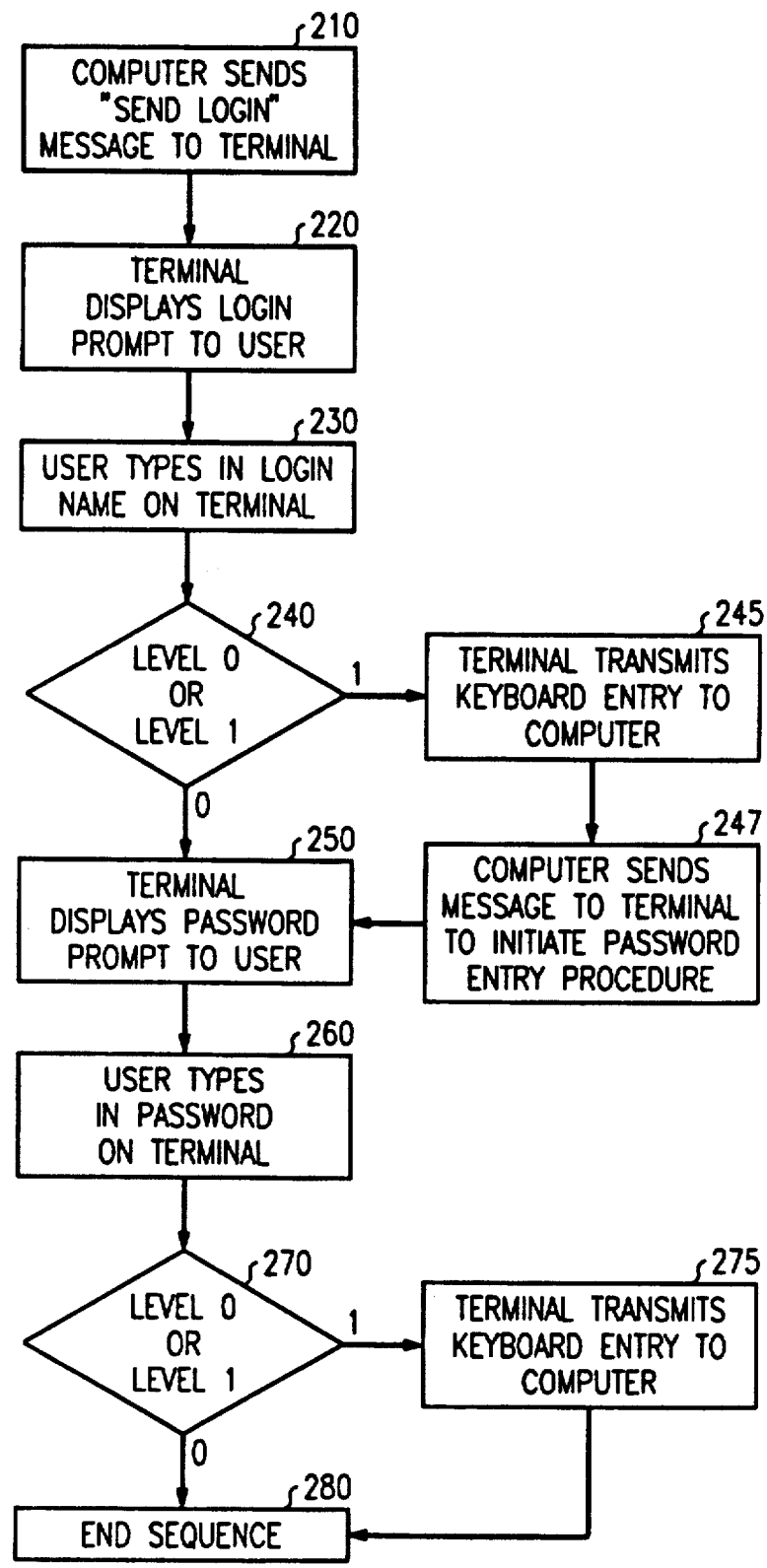
FIG. 2 is a flow diagram of a computer login sequence to be specified using the GRAS system.
Figure 5:
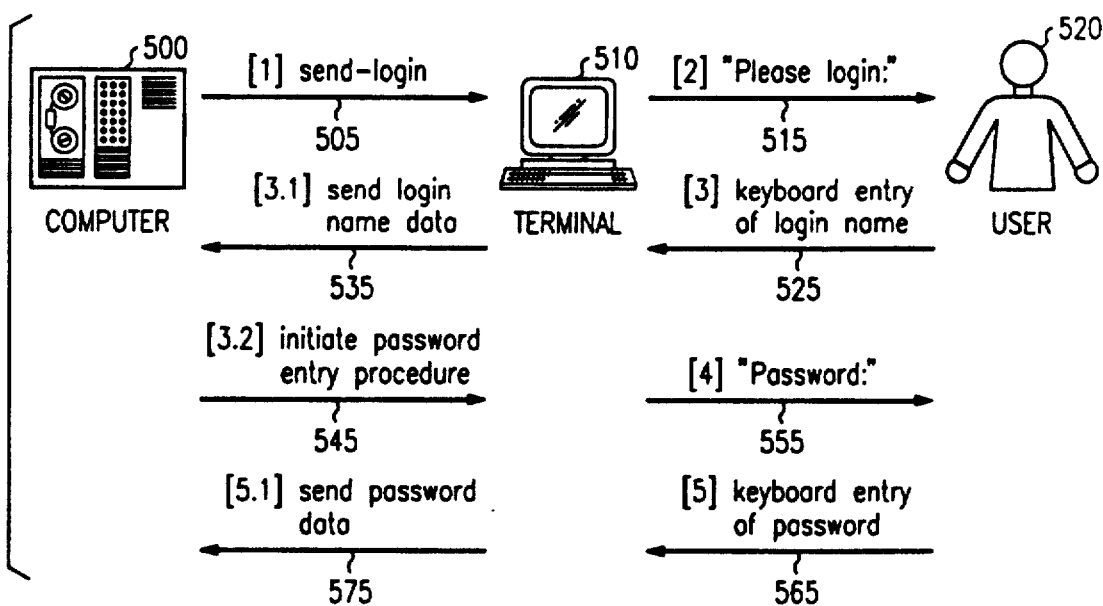

FIGS. 2-5 give an example of how OOScripts are used to provide a specification and a simulation of a computer login sequence. FIG. 2 is a flow chart diagram of the implementation computer sequence, FIG. 3 is diagram showing the corresponding OOScripts used to implement the computer login sequence, and FIGS. 4-5 are graphical displays of a login sequence simulation by GRAS.

A computer 400 initiates the computer login sequence by sending a "send-login" message 405 to a terminal 410 (action block 210). The corresponding OOScript for the initiation step is shown as OOScript 310 in FIG. 3. The terminal 410 responds to the "send-login" message 405 by displaying a login prompt message 415 to a user 420 (action block 220 and OOScript 320). The user 420 responds to the login prompt message by entering his login name on the terminal keyboard 425 (action block 230 and OOScript 330). The next step of the sequence is dependent upon the level of detail of the GRAS simulation. As previously described, the OOScript identifier allows multiple levels of detail. More detailed levels show more in-depth steps of a scenario for more sophisticated users, whereas less detailed levels show a more high-level overview simulation. If the level of detail is determined to be "1" (test 240), two lower-level steps are simulated (FIG. 5) before the next level "0" step is simulated. If the level of detail is "1" (test 240), the terminal 510 transmits the user keyboard entry 525 to the computer 500 via a loginname data message 535 (action block 245 and OOScript 340). The computer 500 then sends the terminal 510 a message 545 to initiate a password entry procedure with the user 520 (action block 247 and OOScript 350). The next step of the simulation is the same for both level 0 and level 1. FIG. 4 will be referred to for the simulation. The terminal 410 sends a "password prompt" message 435 to the user 420 (action block 250 and OOScript 360). The user 420 then enters his password on the keyboard, thereby sending the password data 445 to the terminal 410 (action block 260 and OOScript 370). The GRAS system next determines whether the simulation is level of detail "0" or "1" (test 470). If the level of detail is "0", the simulation is ended (action block 280), however, if the level of detail is "1" (refer to FIG. 5), the terminal 510 sends a password data message 575 to the computer 500 (action block 275 and OOScript 380). The simulation is then ended.

It is to be understood that the above description is only of one preferred embodiment of the invention. Numerous other arrangments may be devised by one skilled in the art without departing from the scope of the invention. The invention is thus limited only as defined in the accompanying claims.

I claim:

1. A method practiced in a computer system of interactively creating specifications for a computer program, comprising:

wherein an actor comprises data and procedures for manipulating that data, wherein said data of an actor comprises a knowledge base, comprising a series of logical assertions, and a history of changes to said data and said logical assertions;

responsive to receipt of actor data, receivable via an input device, specifying actors for use in a plurality of tape programs and storing data for said actors, wherein said specifying comprises creating new actors, selecting previously created actors, and modifying actor data;

wherein a tape program comprises a set of actors and a set of rules of behavior between actors of said set;

responsive to receipt of specification data for operational steps of a plurality of tape programs, receivable via said input device, storing for subsequent execution communications among said actors, relationships among said actors, logical or arithmetic computations for said actors, and decision points for said plurality of tape programs; and thereafter executing steps of a first tape program, responsive to receipt of a decision choice via said input device, said executing comprising:

simulating ones of said operational steps upon the occurrence of predetermined conditions for said ones of said operational steps; and storing results of said simulating;

wherein said simulating comprises at least one of the steps of executing communications among said actors, asserting relationships among said actors, executing a logical or arithmetical computation for said actors or requesting input of a decision choice.

2. The method of claim 1 wherein said executing a first tape program comprises all of the steps of executing communications among actors, asserting relationships among actors, and executing logical or arithmetical computations for said actors.

3. The method of claim 2 wherein said executing a first tape program further comprises the step of requesting input of a decision choice.

4. The method of claim 1 wherein said input device is for specifying a graphical display, and wherein said simulating ones of said operational steps further comprises:

graphically animating ones of said ones of said operational steps.

5. The method of claim 1 further comprising:

responsive to receipt of an instruction, received via said input device during said simulation of said ones of said operational steps, stopping said simulation after simulating one of said operational steps;

responsive to receipt of input data via said input device, storing additional actors or additional operational steps; and responsive to another instruction received via said input device, resuming said simulation of said operational steps, including said additional actors or additional operational steps.

6. The method of claim 1 further comprising:

responsive to receipt of an instruction, received via said input device during said simulation of said operational steps, sequentially reversing said simulation of said operational steps and stopping said reversing after reversing a particular one of said operational steps;

responsive to receipt of input data via said input device, modifying said particular one of said operational steps; and responsive to another instruction received via said input device, resuming said simulation at said particular one of said operational steps.

7. The method of claim 6 wherein said reversing comprises sequentially deleting said results of said simulation.

8. The method of claim 1 wherein said simulating said operational steps comprises:

automatically identifying decision choices for which a program path has not been specified.

9. The method of claim 1 further comprising:

responsive to receipt of entry points via said input device, wherein said entry points are points in said plurality of tape programs of receipt of information from other program specification systems, storing data identifying said entry points.

10. The method of claim 1 further comprising:

constructing a tape program comprising a plurality of rules, wherein each of said plurality of rules specifies at least one of: communications among actors, relationships among actors, logical or arithmetic computations for actors, and decision points for actors.

11. The method of claim 10 further comprising:

combining a set of tape programs into a single, composite tape program for execution of a new group of tape programs.

12. The method of claim 11 wherein said combining comprises:

executing a set union of said plurality of rules.

13. The method of claim 1 wherein each of said actors comprises a data set, and wherein said simulating further comprises:

checking whether an actor's data is sufficient to execute said ones of said operational steps.

14. The method of claim 13 further comprising:

notifying a user of insufficient actor data.

15. The method of claim 13 wherein said data set comprises a history database of changes made to actor data, and wherein said storing results comprises storing changes to said actor data in said history database.

16. The method of claim 15 further comprising:

changing a graphical display of an actor responsive to a change in said actor's history database.

17. The method of claim 16 wherein a plurality of graphical displays correspond to a plurality of views.

18. The method of claim 1 wherein a plurality of levels of simulation are available, and wherein a different set of simulation levels may be specified for each simulation, further comprising:

identifying for each operational step a level of simulation; and when storing results of one of said operational steps, storing said results of said operational step at its appropriate level of simulation.

19. The method of claim 18 wherein a plurality of levels of display are available, and wherein each of said levels of display corresponds to a level of simulation, further comprising:

identifying for each operational step a set of levels of display; and when executing a tape program, displaying results only for those operational steps which are at or below a level which is a member of the set.

20. The method of claim 1 wherein the simulation of one of said operational steps of said tape program comprises:

sending a symbolic message from one actor to another.

21. The method of claim 20 wherein each actor comprises a set of data, wherein said simulating comprises:

changing an actor's data as a part of simulating an operational step, wherein the changing comprises adding or removing attributes of the actor.

22. The method claim 21 wherein the changing comprises changing as a function of existing actor data and message data received by the actor.

23. The method of claim 1 wherein the occurrence of said predetermined condition trigger the simulation of two or more of said operational steps concurrently, further comprising:
if any actor is common to said concurrent operational steps, ensuring that other actors accessing data of the common actor do not access the same data at a same time.

24. The method of claim 23 wherein said ensuring comprises:
before simulation of one operational step, delaying from a time of another operational step for a computed prespecified time.

25. The method of claim 23 wherein said ensuring comprises:
delaying simulation of a first operational step until a second operational step has been simulated.

26. The method of claim 23 further comprising:
executing a called tape program as part of execution of a calling tape program, wherein a tape program comprises a plurality of tape programs; and
returning to said calling tape program following the execution of said called tape program.

27. The method of claim 23 further comprising:
simulating a subset of a second tape program after simulation of a first operational step of a first tape program and prior to stimulation of a second operational step of the first tape program.

28. The method of claim 23 further comprising:
removing a subset of a first tape program for subsequent reuse in another tape program.

29. The method of claim 1 wherein said simulating further comprises: merging two or more actors.

30. The method of claim 29 wherein said merging comprises changing the identification of a first actor to the identification of a second actor.

31. The method of claim 29 wherein said merging comprises combining a first actor and a second actor into a third actor, wherein said combining comprises:
assigning actor communications data of said first actor and said second actor to said third actor; and at least one of the steps of:
assigning actor attribute data and actor relationship data of said first actor to said third actor;
assigning actor attribute data and actor relationship data of said second actor to said third actor;
assigning a selective combination of actor attribute data and actor relationship data from said first actor and said second actor to said third actor; and
assigning actor attribute data and actor relationship data of said first actor and said second actor to said third actor.

32. The method of claim 1 wherein said actors comprise frames, and wherein relationships between said frames are maintained using dual links, further comprising:
storing a self description of one of said frames, wherein said self description is independent from the computer environment where said one of said frames is defined.

33. The method of claim 32 wherein a frame inherits a plurality of attributes and a plurality of relations from its parents.

34. The method of claim 1 wherein a plurality of simulated views are available, and wherein a different set of views may be specified for each simulation wherein each operational step belongs to one or more views.

35. A method practiced in a computer system of interactively creating specifications for a computer program, comprising:
wherein an actor comprises data and procedures for manipulating that data, wherein said data of an actor comprises a knowledge base, comprising a series of logical assertions, and a history of changes to said data and said logical assertions;
responsive to receipt of actor data receivable via an input device, specifying actors for use in a plurality of tape programs and storing data for said actors, wherein said specifying creating new actors, selecting previously created actors, and modifying actor data;
wherein a tape program comprises a set of actors and a set of rules of behavior between actors of said set;
responsive to receipt of operational steps receivable via said input device, storing for subsequent execution communications among said actors, relationships among said actors, logical or arithmetic computations for said actors, and decision points for said plurality of tape programs.

36. In a system containing stored actor data and stored specification data for operational steps of a plurality of tape programs, a method of testing said stored actor data and stored specification data for operational steps, comprising:
wherein an actor comprises data and procedures for manipulating that data, wherein said data of an actor comprises a knowledge base, comprising a series of logical assertions, and a history of changes to said data and said logical assertions;
executing a first program of said plurality of tape programs responsive to receipt of a first decision choice, receivable via an input device, said executing comprising simulating operational steps of said first program upon the occurrence of a predetermined condition for each operational step; and
wherein a tape program comprises a set of actors and a set of rules of behavior between actors of said set;
storing results of said simulating;
wherein said simulating comprises at least one of the steps of executing communications among actors, asserting relationships among actors, executing a logical or arithmetical computation for actors or requesting input of a decision choice.

37. A computer program specification system comprising:
wherein an actor comprises data and procedures for manipulating that data, wherein said data of an actor comprises a knowledge base, comprising a series of logical assertions, and a history of changes to said data and said logical assertions;
means, responsive to receipt of actor data, receivable via an input device, for specifying actors for use in a plurality of tape programs and for storing data for said actors, wherein said specifying comprises creating new actors, selecting previously created actors, and modifying actor data;

wherein a tape program comprises a set of actors and a set of rules of behavior between actors of said set;

means, responsive to receipt of operational steps receivable via said input device, for storing for subsequent execution communications among said actors, relationships among said actors, logical or arithmetic computations for said actors, and decision points for said plurality of tape programs.

38. A computer program specification testing system containing stored actor data and stored specification data for operational steps of a plurality of tape programs, comprising means for testing said stored actor data and stored specification data for operational steps, wherein said testing means comprises:

wherein an actor comprises data and procedures for manipulating that data, wherein said data of an actor comprises a knowledge base, comprising a series of logical assertions, and a history of changes to said data and said logical assertions;

means for executing a first of said plurality of tape programs for evaluating the consistency of a specification, responsive to receipt of a first decision choice, receivable via an input device, said executing comprising simulating operational steps of said first tape program upon the occurrence of a predetermined condition for each operational step; and wherein a tape program comprises a set of actors and a set of rules of behavior between actors of said set;

means for storing results of said simulating;

wherein said simulating comprises at least one of the steps of executing communications among actors, asserting relationships among actors, executing a logical or arithmetical computation for actors or requesting input of a decision choice.

39. The system of claim 38 further comprising:

means, responsive to receipt of an instruction, received via said input device during said simulation of said operational steps, for sequentially reversing said simulation of said operational steps and for stopping said reversing at one of said operational steps.

40. The system of claim 39 further comprising: means, responsive to receipt of input data via said input device, for modifying said one of said operational steps.

41. The system of claim 40 further comprising: means, responsive to another instruction received via said input device, for resuming said simulation at said one of said operational steps.

42. The system of claim 39 wherein said sequentially reversing means comprises means for sequentially deleting results of simulation of individual executed steps.

* * * * *

UNITED STATES PATENT AND TRADEMARK OFFICE
CERTIFICATE OF CORRECTION

PATENT NO. : 5,247,651

DATED : September 21, 1993

INVENTOR(S) : Oliver B.H. Clarisse

It is certified that error appears in the above-indentified patent and that said Letters Patent is hereby corrected as shown below:

Column 53, Claim 23, line 8, should read --said predetermined conditions trigger--.

Column 53, Claim 27, line 34, delete "stimulation" and substitute --simulation--.

Signed and Sealed this

Twenty-first Day of June, 1994

Attest:

BRUCE LEHMAN

*Attesting Officer*     *Commissioner of Patents and Trademarks*